(12) United States Patent
Xiong et al.

(10) Patent No.: US 10,631,281 B2
(45) Date of Patent: Apr. 21, 2020

(54) TRANSMISSION DESIGNS FOR RADIO ACCESS TECHNOLOGIES

(71) Applicant: INTEL IP CORPORATION, Santa Clara, CA (US)

(72) Inventors: Gang Xiong, Portland, OR (US); Jong-Kae Fwu, Sunnyvale, CA (US); Seunghee Han, San Jose, CA (US); Huaning Niu, San Jose, CA (US); Ralf Bendlin, Portland, OR (US); Yuan Zhu, Beijing (CN)

(*) Notice: Subject to any disclaimer, the term of this patent is extended or adjusted under 35 U.S.C. 154(b) by 0 days.

(21) Appl. No.: 15/560,472

(22) PCT Filed: Dec. 3, 2015

(86) PCT No.: PCT/US2015/063803
§ 371 (c)(1),
(2) Date: Sep. 21, 2017

(87) PCT Pub. No.: WO2016/171765
PCT Pub. Date: Oct. 27, 2016

(65) Prior Publication Data
US 2018/0063820 A1 Mar. 1, 2018

Related U.S. Application Data

(60) Provisional application No. 62/150,988, filed on Apr. 22, 2015.

(51) Int. Cl.
*H04W 72/04* (2009.01)
*H04L 5/00* (2006.01)
*H04L 5/14* (2006.01)

(52) U.S. Cl.
CPC ......... *H04W 72/042* (2013.01); *H04L 5/0094* (2013.01); *H04L 5/1469* (2013.01); *H04L 5/0007* (2013.01); *H04L 5/0044* (2013.01)

(58) Field of Classification Search
CPC ... H04W 72/042; H04L 5/1469; H04L 5/0094
See application file for complete search history.

(56) References Cited

U.S. PATENT DOCUMENTS

| | | | | |
|---|---|---|---|---|
| 2011/0305179 A1* | 12/2011 | Wang | ................... | H04L 1/0031 370/311 |
| 2011/0310759 A1* | 12/2011 | Gerstenberger | ........ | H04L 5/001 370/252 |
| 2015/0188650 A1* | 7/2015 | Au | ........................ | H04J 3/1694 370/312 |

OTHER PUBLICATIONS

Lahetkanngas Eeva et al: "On the TDD subframe structure for beyond 4G radio access network", 2013 Future Network & Mobile Summit, Authors, Jul. 3, 2013 (Jul. 3, 2013), pp. 1-10, XP032506927.*

(Continued)

*Primary Examiner* — Yemane Mesfin
*Assistant Examiner* — Henry Baron

(57) ABSTRACT

Technology described herein addresses symmetric uplink (UL)/downlink (DL) designs that can be applied to both uplink and downlink transmissions. A symmetric UL/DL design can define a Transmission Time Interval (TTI) format with control channels and data channels multiplexed using Frequency Division Multiplexing (FDM) or Time Division Multiplexing (TDM) to partition the control channels and the data channels within a Transmission Time Interval (TTI). A unified waveform can be applied to both UL and DL transmissions. Several Demodulation Reference Signal (DM-RS) designs are also described. A hybrid mode for UL transmissions is also described.

10 Claims, 17 Drawing Sheets

(56) References Cited

OTHER PUBLICATIONS

Lahetkanngas Eeva et al: "On the TDD subframe structure for beyond 4G radio access network", 2013 Future Network & Mobile Summit, Authors, Jul. 3, 2013 (Jul. 3, 2013), pp. 1-10.*
Lahetkangas Eeva et al; On the TDD Subframe Structure for Beyond 4G Radio Access Network; 2013 Future Network & Mobile Summit; Jul. 3, 2013.
Levanen Toni et al; Dense Small-Cell Networks: Rethinking the Radio Interface Beyond LTE-Advanced; 2014 1st International Conference on 5G for Upiquitous Connectivity (5GU).
Sassan Ahmadi; Chapter 9: The IEEE 802.16m Physical Layer (Part 1); Copyright 2011 Elsevier Inc.
Erik Dahlman et al; Chapter 10: Downlink Physical-Layer Processing; 4G: LTE/LTE-Advanced for Mobile Broadband; Copyright 2014.

* cited by examiner

300

| Antenna port $p$ | $[\overline{w}_p(0) \quad \overline{w}_p(1) \quad \overline{w}_p(2) \quad \overline{w}_p(3)]$ |
|---|---|
| 0,4 | $[+1 \quad +1 \quad +1 \quad +1]$ |
| 1,5 | $[+1 \quad -1 \quad +1 \quad -1]$ |
| 2,6 | $[+1 \quad +1 \quad -1 \quad -1]$ |
| 3,7 | $[+1 \quad -1 \quad -1 \quad +1]$ |

FIG. 3

TRANSMISSION DESIGNS FOR RADIO ACCESS TECHNOLOGIES

BACKGROUND

Wireless mobile communication technology uses various standards and protocols to transmit data between a network node (e.g., a transmission station) and a wireless device (e.g., a mobile device). Some wireless devices communicate using orthogonal frequency-division multiple access (OFDMA) in a downlink (DL) transmission and single-carrier frequency-division multiple access (SC-FDMA) in an uplink (UL) transmission. Standards and protocols that use orthogonal frequency-division multiplexing (OFDM) for signal transmission include the third-generation partnership project (3GPP) long-term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. In addition, a fifth generation (5G) standard is currently being developed.

In 3GPP radio access network (RAN) LTE systems, the network node can be an Evolved Universal Terrestrial Radio Access Network (E-UTRAN) Node B (also commonly denoted as evolved Node Bs, enhanced Node Bs, eNodeBs, or eNBs). The network node can communicate with the wireless device; a user equipment (UE) is one example of such a wireless device. The downlink (DL) transmission can be a communication from the network node (e.g., eNodeB) to the wireless device (e.g., UE), and the uplink (UL) transmission can be a communication from the wireless device to the network node. The geographical area wherein wireless devices are served by the network node can be referred to as a cell.

In LTE systems, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3 illustrates a table that identifies orthogonal cover codes (OCCs) that can be applied to respective antenna ports (APs);

Figure 1A:
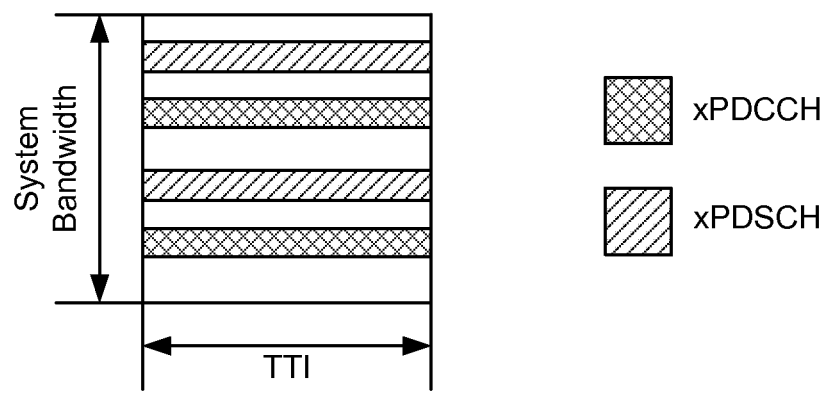
FIG. 1a illustrates a multiplexing approach that may be used for a data channel over a system bandwidth for a Transmission Time Interval (TTI)

Reference will now be made to the exemplary embodiments illustrated and specific language will be used herein to describe the same. It will nevertheless be understood that no limitation of the scope of is thereby intended.

DETAILED DESCRIPTION

Before some embodiments are disclosed and described, it is to be understood that the claimed subject matter is not limited to the particular structures, process operations, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology nor is it intended to limit the scope of the claimed subject matter.

Mobile communication has evolved significantly from early voice systems to today's highly sophisticated communication platform. Fourth-Generation Long-Term Evolution (4G LTE) networks are deployed in over a hundred countries to provide cellular service in various spectrum-band allocations based on various spectrum regimes. Recently, details regarding a fifth generation (5G) wireless communication technology have been proposed.

The 5G wireless communication system is being designed to provide various users and applications with access to information and data sharing in areas served by 5G networks. The 5G standard is expected to establish a unified network and system that is capable of accommodating vastly different—and sometimes conflicting—performance requirements in different areas at different times. These diverse performance requirements can be driven by different services and applications, by the number and types of wireless devices in a given area, and even by movement patterns of populations that use mobile devices. For example, a cellular base station in a principally residential suburban area might experience high peak loads of wireless traffic for brief periods of time in the mornings before residents leave for work in a nearby city, but might experience very low loads for most of the day until residents return in the evening.

As a result, the 5G standard is being developed to include technical components and transfer protocols that can overcome some of the limits of existing wireless networks. In general, 5G may be partly based on third-generation partnership project (3GPP) long-term evolution (LTE) advanced standards and will potentially accommodate the use of additional Radio Access Technologies (RATs). It is intended that 5G networks will provide simple, fast, and seamless wireless connectivity solutions for a rich variety of wireless devices and applications.

Systems, methods, and technologies of the current disclosure provide transmission schemes that may be applied in a wireless networks (e.g., a 5G wireless network). Specifically, the current disclosure provides descriptions of a symmetric downlink and uplink designs, Demodulation Reference Signal (DM-RS) designs, and a hybrid mode for uplink transmission.

Symmetric Downlink and Uplink Design

A symmetric downlink and uplink design for 5G systems offers several benefits. For example, a symmetric downlink and uplink design allows implementation of a 5G receiver to be simplified, especially for Device-to-Device (D2D) communication. In addition, for Time-Division Duplexing (TDD) 5G system, a symmetric downlink and uplink design allows good interference cancellation and mitigation performance. This interference cancellation and mitigation is helpful for both dynamic TDD systems wherein different cells may use different may use different uplink (UL)/downlink (DL) switching points and full-duplex TDD systems wherein transceivers need to cancel out self-interference.

In order to facilitate a symmetric downlink and uplink design, a unified waveform can be adopted for both uplink and downlink transmissions. In one example, Orthogonal Frequency Division Multiple Access (OFDMA) can be adopted for both uplink and downlink transmissions. In another example, Single Carrier Frequency Division Multiple Access (SC-FDMA) can be adopted for both uplink and downlink transmissions. Other types of waveforms can also be used.

Figure 1B:
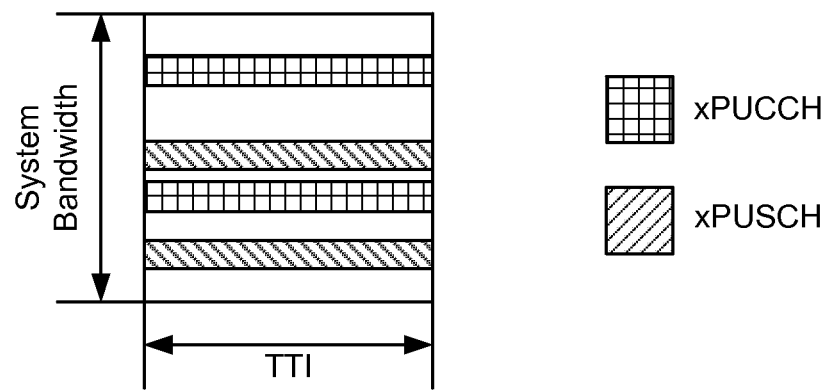
FIG. 1b illustrates a multiplexing approach that may be used for a control channel over a system bandwidth for a Transmission Time Interval (TTI)

FIGS. 1a and 1b illustrate a multiplexing approach that may be used for data and control channels, respectively (e.g., in a 5G system), over a system bandwidth for a Transmission Time Interval (TTI). In order to allow multiple RATs and partitions to seamlessly coexist within one system bandwidth, control and data channels for a 5G system can be multiplexed in a Frequency Division Multiplexing (FDM) manner.

As shown in FIG. 1a, a narrowband 5G Physical Downlink Control Channel (xPDCCH) can be used (unlike the scheme of existing LTE specifications, which does not use a narrowband PDCCH). In one example, a distributed transmission mode can be used for the transmission of the xPDCCH so that benefits of frequency diversity can be exploited. In another example, a localized transmission mode can be used so that closed-loop frequency-dependent scheduling gain can be achieved. One or both of a distributed transmission mode and a localized transmission mode can be supported by a 5G system. A localized transmission mode or a distributed transmission mode can be configured via Master Information Block (MIB) signaling, System Information Block (SIB) signaling, or UE-specific Radio Resource Control (RRC) signaling. In addition, allocation of time and frequency resources can be configured via MIB signaling, SIB signaling, or UE-specific RRC signaling.

As shown in FIG. 1b, a 5G Physical Uplink Control Channel (xPUCCH) can occupy a portion of frequency resources that are not located at the edge of a region of system bandwidth. Both a distributed transmission mode and/or a localized transmission mode for the xPUCCH can be supported (e.g., in a 5G system). A localized transmission mode or a distributed transmission mode can be configured via Master Information Block (MIB) signaling, System Information Block (SIB) signaling, or UE-specific Radio Resource Control (RRC) signaling. In addition, allocation of time and frequency resources can be configured via MIB signaling, SIB signaling, or UE-specific RRC signaling.

FIGS. 1a and 1b illustrate an example in which the xPDCCH, the xPDSCH, the xPUCCH, and the xPUSCH can be sent in any subset of the system bandwidth and the UL and DL are symmetric across the entire system bandwidth. Examples in which only selected portions of the system bandwidth have a symmetric UL/DL design are also possible. For instance, in some examples, some subcarrier frequency resources (e.g., near an edge of the system bandwidth) can be reserved for a particular channel (e.g., the xPUCCH). For such subcarrier frequency resources that are not symmetric with respect to UL and DL, interference cancellation and mitigation performance may be less effective than in examples where the entire system bandwidth is symmetric. Hence, if some portions of the system bandwidth do not have a symmetric UL/DL design, neighboring cells may benefit by aligning the asymmetric UL/DL frequency resources with each other. Neighboring cellular base stations the serve the neighboring cells can signal each other in order to communicate which subcarriers are asymmetric with regard to UL and DL. The neighboring cellular base stations can then align their asymmetric frequency resources with each other or, alternatively, schedule only low-power transmissions to be sent in the asymmetric resources. Neighboring cells can also provision extra protection for asymmetric UL/DL resources through enhanced Inter-cell Interference Coordination (eICIC) or through Network-Assisted Interference Canceling and Suppression (NAICS) procedures.

Alternatively, in order to allow seamless coexistence between multiple Radio Access technologies (RATs) and/or partitions within a single system bandwidth, control and data channels for a 5G system can be multiplexed in a Time Division Duplexing (TDM) manner In examples where a TDM approach is used, a Transmission Time Interval (TTI) can comprise time-domain partitions for an xPDCCH, an xPDSCH, an xPUCCH, and an xPUSCH. In addition, when TDM is applied, there may be one partition within a TTI that has a symmetric UL/DL design, while other partitions within the TTI need not have a symmetric UL/DL design.

Figure 2:
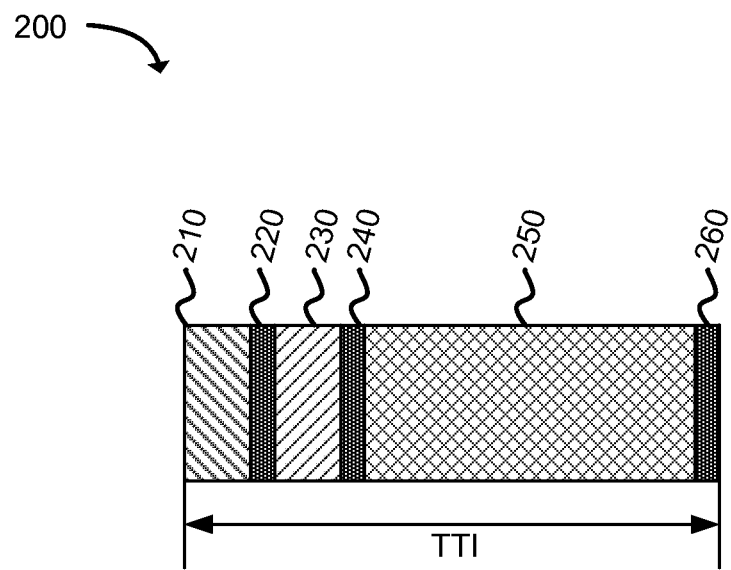
FIG. 2 illustrates an example of a TTI that comprises a downlink control information (DCI) time-domain partition, an uplink control information (UCI) time-domain partition, and a symmetric uplink (UL)/downlink (DL) time-domain partition that is dynamically assignable.

FIG. 2 illustrates an example of a TTI 200 that comprises a downlink control information (DCI) time-domain partition 210, an uplink control information (UCI) time-domain partition 230, and a symmetric uplink (UL)/downlink (DL) time-domain partition 250 that is dynamically assignable. The TTI 200 also comprises guard periods (GPs) 220, 240, and 260 in order to allow Radio Frequency (RF) circuitry at transmitters or receivers to switch between different duplex directions. The DCI time-domain partition 210 can be reserved for the xPDCCH, while the UCI time-domain partition 230 can be reserved for the xPUCCH. The symmetric UL/DL time-domain partition 250 can be dynamically assigned to the xPDSCH or the xPUSCH using a flag included in the DCI. Alternatively, the symmetric UL/DL time-domain partition 250 can be used as an Almost Blank Subframe (ABS) for interference coordination among cells or transmission points.

In some examples, each TTI used in a set of transmissions can be divided into time-domain partitions just as the TTI 200 that is depicted in FIG. 2. The length in OFDM symbols of each time-domain partition, including the DCI time-domain partition 210, the UCI time-domain partition 230, and/or the symmetric UL/DL time-domain partition 250, can be semi-statically configured using one or more of MIB signaling, SIB signaling, or UE-specific RRC signaling. Alternatively, the length of each time domain partition can be dynamically indicated by means of physical layer signaling. When a load in a Medium Access Control (MAC) buffer varies between TTIs, benefits from statistical multiplexing gain can be achieved when the length of each time-domain partition is dynamically configured. When the length of each time domain partition is semi-statically or dynamically configured, the length of the DCI time-domain partition 210 and the length of the UCI time-domain partition 230 can be equal or different. In another alternative, the length of the DCI time-domain partition 210 and the length of the UCI time-domain partition 230 can be predefined in a specification.

In another example, it may not be necessary for every TTI to comprise both a DCI time-domain partition and a UCI time-domain partition. For instance, for services or applications that have very low latency requirements, it may be beneficial to include a UCI time-domain partition in every TTI to allow timely acknowledgement of successful reception of DL xPDSCH transmissions. Such acknowledgement can be sent as an Acknowledgement (ACK) or Negative Acknowledgement (NACK) signal in the UCI time-domain partition. However, in circumstances where spectral efficiency is more important than low latency, some TTIs can be configured to comprise only one of either a DCI time-domain partition or a UCI time-domain partition so that fewer guard periods may be used per TTI in order to increase spectral efficiency.

If some time-domain partitions of a TTI do not have a symmetric UL/DL design (e.g., a DCI time-domain partition 210 or a UCI time-domain partition 230), neighboring cells may benefit by aligning the asymmetric UL/DL time resources with each other. For example, neighboring cellular base stations that serve the neighboring cells can coordinate the boundary in time where the symmetric UL/DL time-domain partition 250 begins (e.g., the time at which the first OFDM symbol of the symmetric UL/DL time-domain partition 250 is situated). In examples where different TTIs have different locations of boundaries between partitions, the cellular base stations can also coordinate how these boundaries are configured accordingly. Neighboring cells can also provision extra protection for asymmetric UL/DL resources through enhanced Inter-cell Interference Coordination (eICIC) or through Network-Assisted Interference Canceling and Suppression (NAICS) procedures.

DM-RS Designs

A Demodulation Reference Signal (DM-RS, or DMRS), is generally embedded in PUCCH and PUSCH transmissions and provides a phase reference used for demodulating data for these channels and for channel estimation. A transmitting terminal should generally transmit DM-RSs for a receiving terminal to perform Multiple-Input Multiple-Output (MIMO) decoding and related demodulation. DM-RSs should generally be designed such that DM-RSs corresponding to each respective data transmission layer are mutually orthogonal in order to minimize interference between equivalent channels of pre-encoded channels of respective transmit antennas. DM-RSs corresponding to each data transmission layer can be distinguished via FDM and/or code division multiplexing (CDM). Code division multiplexing can be implemented by spreading sequences whose correlation is ideal with orthogonal cover codes (OCC). The OCCs may employ, for example, Walsh Code sequences, Discrete Fourier Transform sequences, or other desired types of codes.

FIG. 3 illustrates a table 300 that identifies orthogonal cover codes (OCCs) that can be applied to respective antenna ports (APs). These orthogonal cover codes can be used with the DM-RS designs shown in FIGS. 4-6.

In conjunction with a symmetric uplink and downlink (UL/DL) design, a unified DM-RS pattern can be adopted. The unified DM-RS pattern can apply to both uplink and downlink data channels (e.g., the xPDSCH and the xPUSCH). The unified DM-RS pattern can also apply to both uplink and downlink control channels (e.g., the xPDCCH and the xPUCCH).

Several options can be considered for the unified DM-RS pattern. In one example (option 1), the DM-RS for PDSCH Transmission Modes (TMs) 9 and 10, as described in 3GPP LTE standard release 12.0, can be reused for a 5G system. Other examples of DM-RS patterns are provided in FIGS. 4-9, as explained below.

Figure 4:
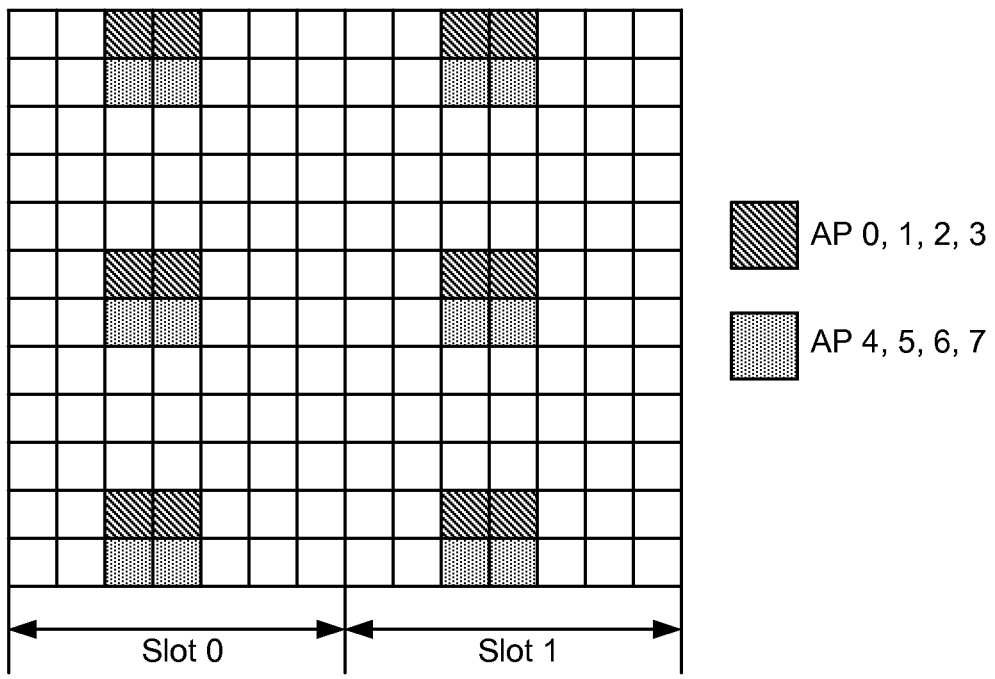
FIG. 4 illustrates an example (option 2) of a unified DM-RS pattern that can be used in conjunction with a symmetric UL/DL design.

FIG. 4 illustrates an example (option 2) of a unified DM-RS pattern 400 that can be used in conjunction with a symmetric UL/DL design. In this example, the DM-RS can be transmitted in Orthogonal Frequency Division Multiplexing (OFDM) symbols 2 and 3 in each slot within one TTI, as shown in FIG. 4. DM-RS sequence generation can be done as described in an existing LTE specification (e.g., 3GPP LTE release 12.0). The OCCs applied for respective antenna ports can be defined by table 300 of FIG. 3.

Figure 5:
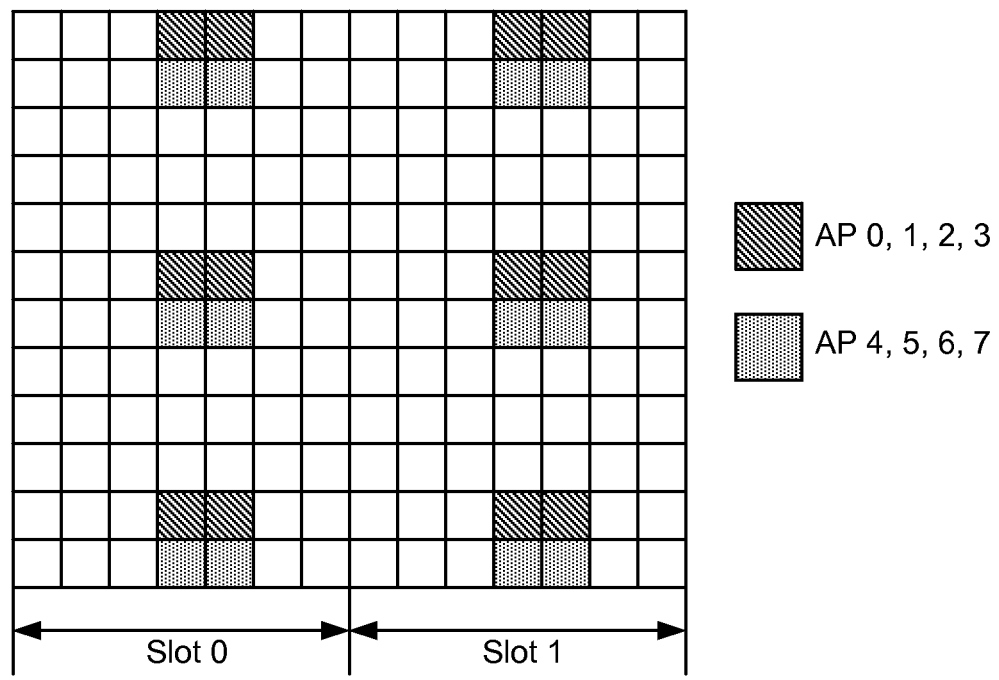
FIG. 5 illustrates another example (option 3) of a unified DM-RS pattern that can be used in conjunction with a symmetric UL/DL design.

FIG. 5 illustrates another example (option 3) of a unified DM-RS pattern 500 that can be used in conjunction with a symmetric UL/DL design. In this example, the DM-RS can be transmitted in Orthogonal Frequency Division Multiplexing (OFDM) symbols 3 and 4 in each slot within one TTI, as shown in FIG. 5. DM-RS sequence generation can be done as described in an existing LTE specification (e.g., 3GPP LTE release 12.0). The OCCs applied for respective antenna ports can be defined by table 300 of FIG. 3.

Figure 6:
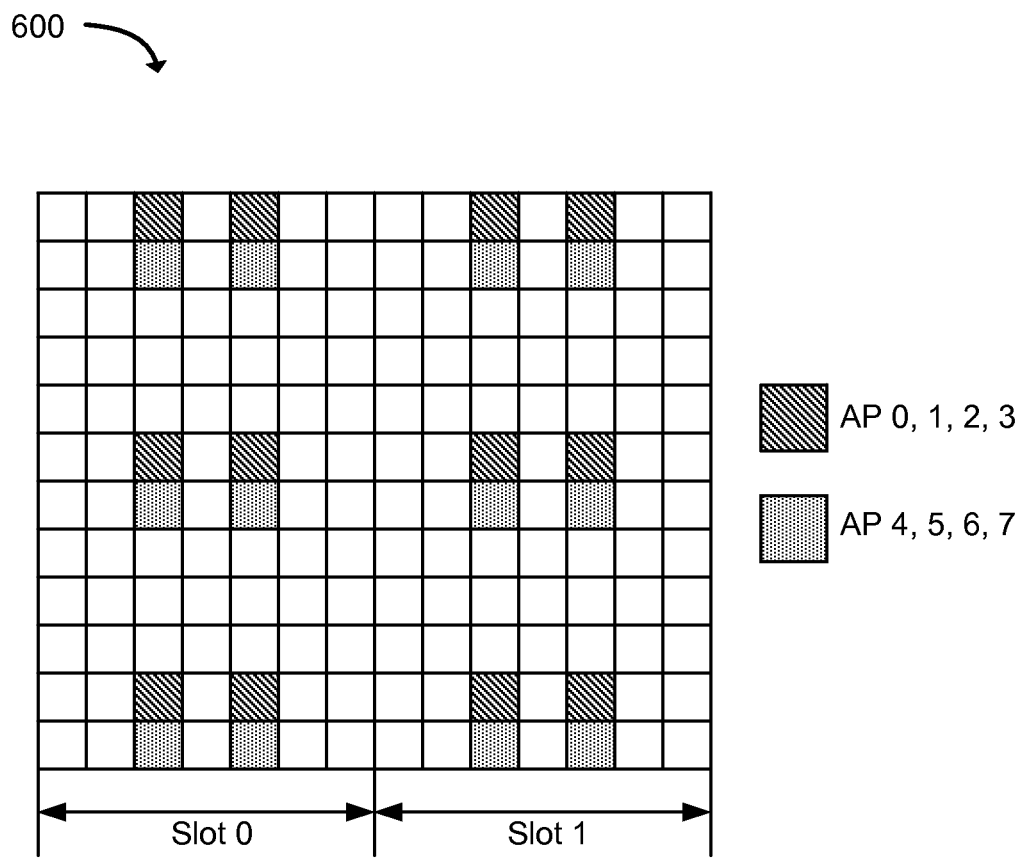
FIG. 6 illustrates another example (option 4) of a unified DM-RS pattern that can be used in conjunction with a symmetric UL/DL design.

FIG. 6 illustrates another example (option 4) of a unified DM-RS pattern 600 that can be used in conjunction with a symmetric UL/DL design. In this example, the DM-RS can be transmitted in Orthogonal Frequency Division Multiplexing (OFDM) symbols 2 and 4 in each slot within one TTI, as shown in FIG. 6. DM-RS sequence generation can be done as described in an existing LTE specification (e.g., 3GPP LTE release 12.0). The OCCs applied for respective antenna ports can be defined by table 300 of FIG. 3.

Figure 7:
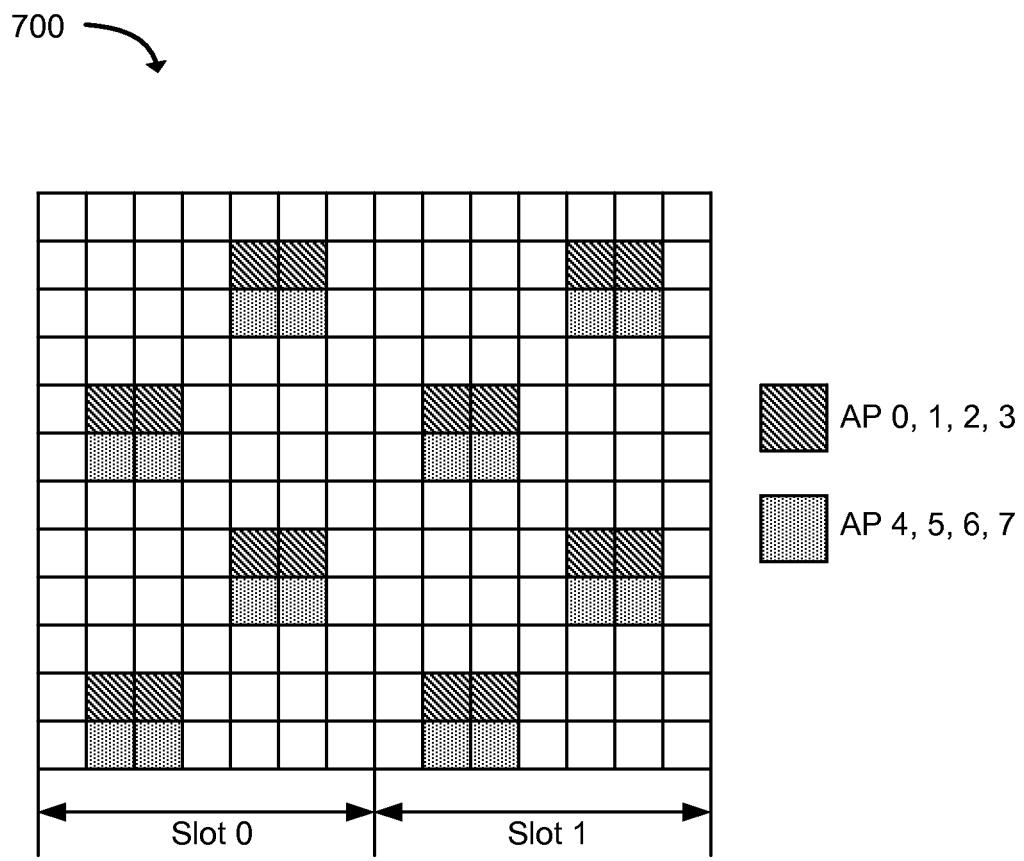
FIG. 7 illustrates another example (option 5) of a unified DM-RS pattern that can be used in conjunction with a symmetric UL/DL design.

FIG. 7 illustrates another example (option 5) of a unified DM-RS pattern 700 that can be used in conjunction with a symmetric UL/DL design. In this example, the DM-RS can be transmitted in a scattered pattern in order to allow near-optimal channel estimation performance. The resource mapping for normal cyclic prefix and non-special subframe scenarios can be defined as follows; the design principle used in the following definition can also be straightforwardly extended to apply to extended cyclic prefix and special subframe scenarios.

For an antenna port $p \in \{0,1,2,3,4,5,6,7\}$ in a physical resource block $n_{PRB}$ assigned, a part of the reference signal sequence $r(m)$ can be mapped to complex-valued modulation symbols $a_{k,l}^{(p)}$ in a subframe according to Normal cyclic prefix:

$$a_{k,l}^{(p)} = w_p(l'') \cdot r(2 \cdot l' \cdot N_{RB}^{max,DL} + 2 \cdot n_{PRB} + m')$$

where $$w_p(i) = \begin{cases} \overline{w}_p(i) & l' \in \{0, 1, 4, 5\} \\ \overline{w}_p(3-i) & l' \in \{2, 3, 6, 7\} \end{cases}$$

$$k = 6m' + N_{sc}^{RB} n_{PRB} + k'$$

$$k' = \begin{cases} 1 & p \in \{0, 1, 2, 3\} \text{ and } l' \in \{0, 1, 4, 5\} \\ 4 & p \in \{0, 1, 2, 3\} \text{ and } l' \in \{2, 3, 6, 7\} \\ 0 & p \in \{4, 5, 6, 7\} \text{ and } l' \in \{0, 1, 4, 5\} \\ 3 & p \in \{4, 5, 6, 7\} \text{ and } l' \in \{2, 3, 6, 7\} \end{cases}$$

$$l = \begin{cases} l' \bmod 4 + 1 & l' \in \{0, 1, 4, 5\} \text{ and not in a special subframe} \\ l' \bmod 4 + 2 & l' \in \{2, 3, 6, 7\} \text{ and not in a special subframe} \end{cases}$$

$$l'' = 2 \cdot \lfloor l'/4 \rfloor + (l' \bmod 2)$$

$$l' = \begin{cases} 0, 1, 2, 3 & \text{if } n_s \bmod 2 = 0 \text{ and not in special subframe} \\ 4, 5, 6, 7 & \text{if } n_s \bmod 2 = 1 \text{ and not in special subframe} \end{cases}$$

$$m' = 0, 1$$

The sequence $\overline{w}_p(i)$ is given by Table 300 of FIG. 3; $N_{RB}^{max,DL}$ is the maximum number of PRBs in the downlink (DL).

In some examples, in order to avoid time-frequency collisions with transmissions from neighboring cells, a cell-specific frequency shift can be applied to the unified DM-RS pattern 700. For instance, the cell-specific frequency shift can be defined as ($N_{ID}^{cell}$ mod 3), where $N_{ID}^{cell}$ is a cell identifier (ID) and mod is a modulus (a.k.a. modulo) operator.

Figure 8:
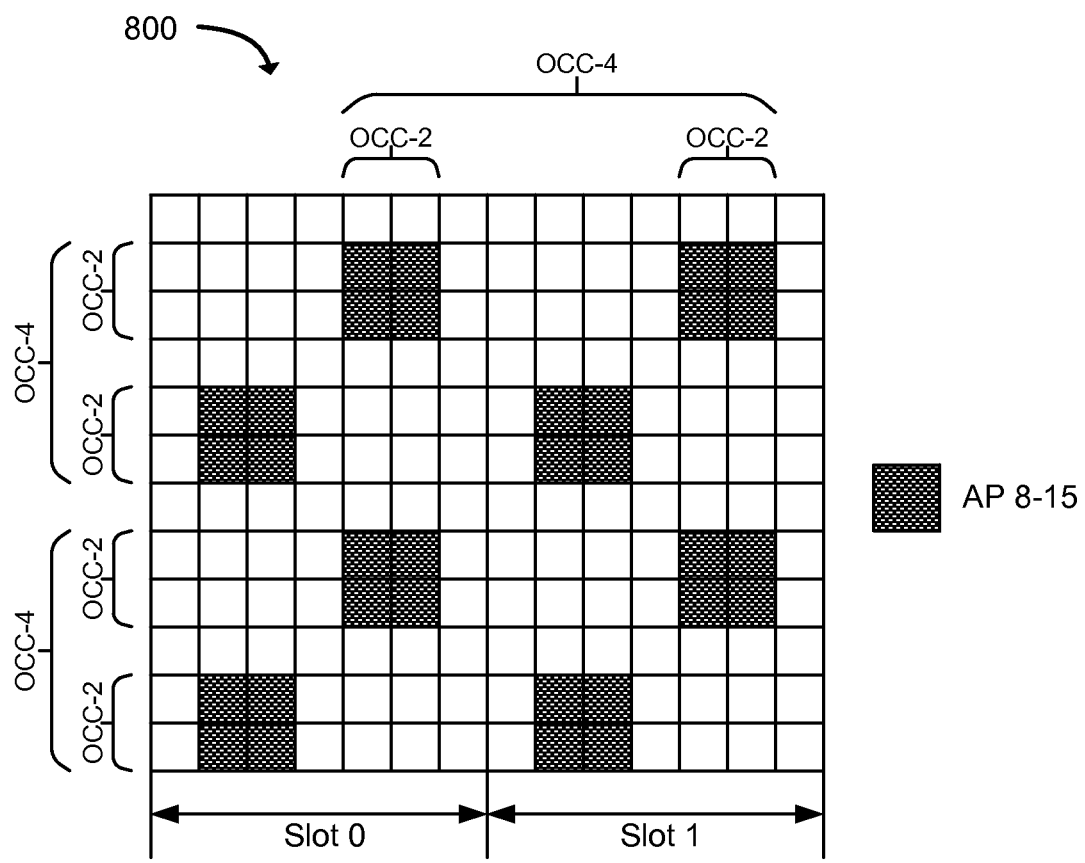
FIG. 8 illustrates an example of a unified DM-RS pattern that may be applied in order to support up to 16 data transmission layers.

FIG. 8 illustrates an example of a unified DM-RS pattern 800 that may be applied in order to support up to 16 data transmission layers. OCCs of length 2 and OCCs of length 4 can be applied in both the time domain (the horizontal axis of FIG. 8) and in the frequency domain (the vertical axis of FIG. 8) on APs in order to separate the data transmission layers. The unified DM-RS pattern 800 can be extended to support up to 32 data transmission layers if an OCC of length 8 is applied in the frequency domain.

Figure 9:
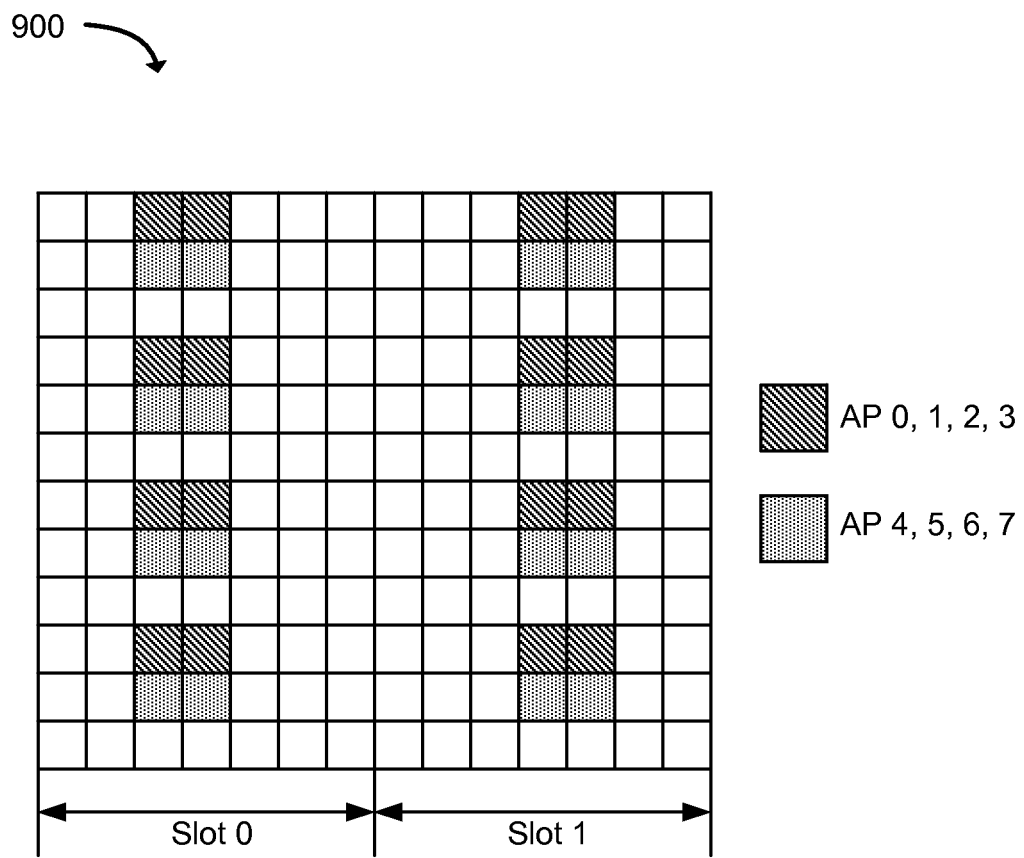
FIG. 9 illustrates an example of a unified DM-RS pattern that has a higher relative density relative to the frequency domain.

FIG. 9 illustrates an example of a unified DM-RS pattern 900 that has a higher relative density relative to the frequency domain. This higher density can be achieved by reducing a frequency distance between DM-RS symbols to 2 resource elements, as shown in the unified DM-RS pattern 900. As a result of the higher density of DM-RS symbols in the frequency domain, the unified DM-RS pattern 900 can be used to support extended cyclic prefix and special subframe schemes.

Hybrid Mode for Uplink Transmission

Current LTE standards prescribe SC-FDMA as the transmission waveform for UL transmissions and OFDMA as the transmission waveform for DL transmissions.

Figure 10:
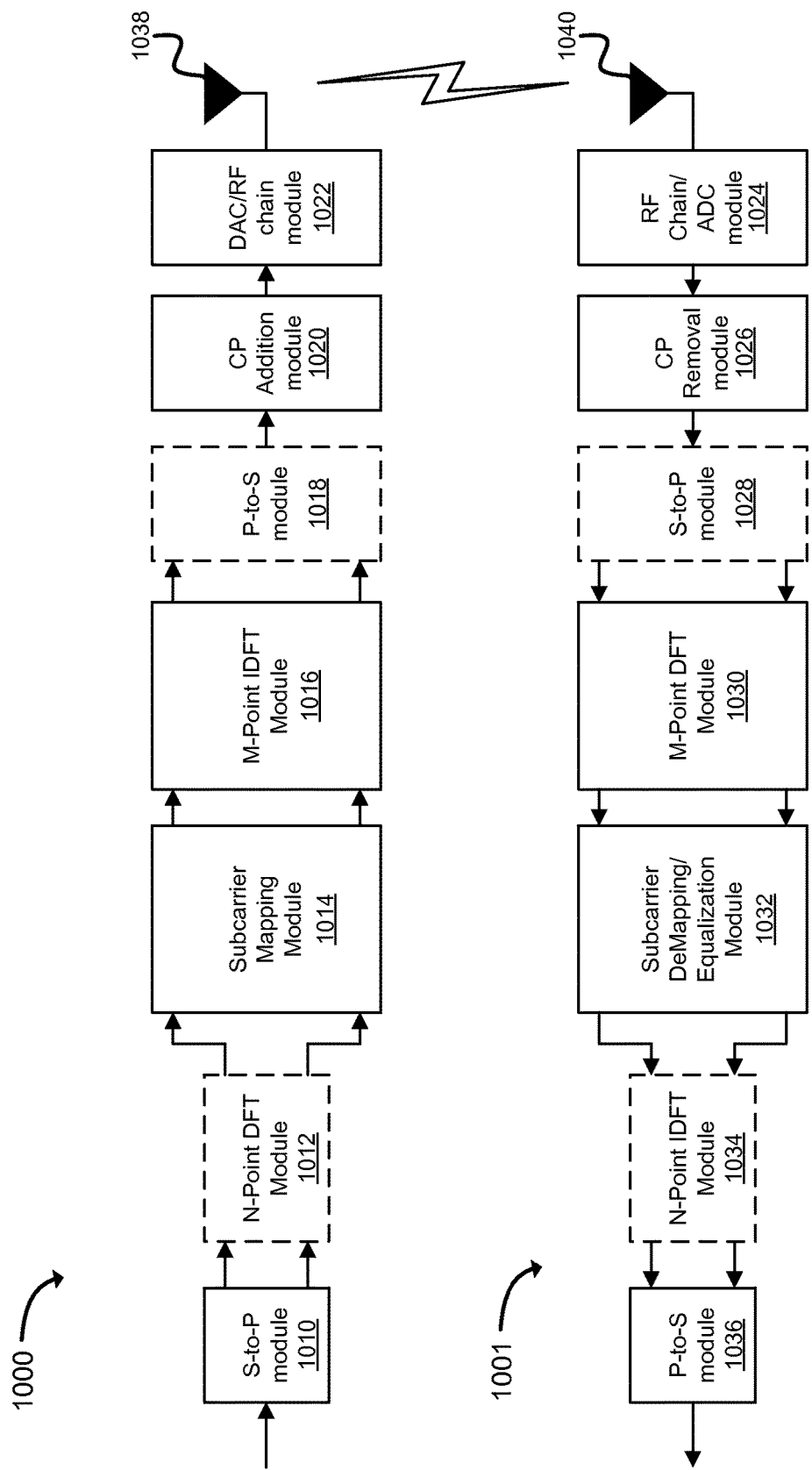
FIG. 10 illustrates the structure of a transmitter and a receiver for SC-FDMA and OFDMA.

FIG. 10 illustrates the structure of a transmitter 1000 and a receiver 1001 for SC-FDMA and OFDMA. The modules shown in dotted lines, including the N-Point Discrete Fourier Transform (DFT) module 1012, the Parallel-to-Serial conversion (P-to-S) module 1018, the Serial-to-Parallel conversion (S-to-P) module 1028, and the N-Point Inverse Discrete Fourier Transform (IDFT) module 1034, are used for SC-FDMA, but are not necessary for OFDMA.

A digital signal for transmission can be received at a Serial-to-Parallel conversion (S-to-P) module 1010 at the transmitter 1000. If the transmitter 1000 is used for SC-FDMA, the digital signal may then be sent to the N-Point Discrete Fourier Transform (DFT) module 1012 so that a DFT can be applied. The digital signal can then be sent to the subcarrier mapping module 1014 and then to the M-Point Inverse Discrete Fourier Transform (IDFT) module 1016. If the transmitter 1000 is used for SC-FDMA, the digital signal may then be sent to the Parallel-to-Serial conversion (P-to-S) module 1018. The digital signal can then be sent to the Cyclic Prefix (CP) addition module 1020 and subsequently to the Digital-to-Analog Converter (DAC)/Radio Frequency (RF) chain module 1022 for conversion to an analog signal that is wirelessly transmitted using the antenna(s) 1038.

The analog signal can be received at the antenna(s) 1040 of the receiver 1001 and converted to a digital signal by the RF chain/Analog-to-Digital converter (ADC) module 1024. The digital signal can then be sent to the Cyclic Prefix (CP) removal module 1026. If the receiver 1001 is used for SC-FDMA, the digital signal may then be sent to the Serial-to-Parallel conversion (S-to-P) module 1028. The digital signal can then be sent to the M-Point DFT module 1030 and then to the Subcarrier DeMapping/Equalization Module 1032. If the receiver 1001 is used for SC-FDMA, the digital signal can then be sent to the N-Point IDFT module 1034. Finally, the digital signal can be sent to the Parallel-to-Serial conversion (P-to-S) module 1036.

Both OFDMA and SC-FDMA provide certain advantages. SC-FDMA, for example, provides an advantage of a low Peak-to-Average Power Ratio (PAPR). A low PAPR is helpful for efficient Power Amplifier (PA) operation. A high PAPR may necessitate additional PA backoff. This additional PA backoff can cause a UE to not send an uplink transmission with full transmit power and can therefore reduce a link budget for the uplink transmission.

However, OFDMA can provide frequency-selective scheduling gain compared to SC-FDMA. For SC-FDMA transmissions, the basic resource-allocation scheme for uplink transmissions employs single-cluster allocations in which resource blocks are contiguous in the frequency domain. In 3GPP LTE release 10, multi-cluster transmissions of up to two clusters on a single component carrier have been adopted for uplink transmissions in order to improve frequency-selective scheduling gain.

Hence, benefits can be gained by allowing a UE in a limited-coverage scenario to use the SC-FDMA waveform for uplink transmissions in order to improve the link budget. For UEs in a normal-coverage scenario, however, using the OFDMA waveform for uplink transmissions can provide the benefit of frequency-selective scheduling. A hybrid mode for uplink transmission that allows SC-FDMA to be used when coverage is relatively limited and OFDMA to be used when coverage is normal can therefore provide the benefits of both waveforms. An indication of whether SC-FDMA or OFDMA is to be used for uplink transmissions at a given time can be signaled dynamically or semi-statically.

In one example, the indication of whether SC-FDMA or OFDMA is to be used can be signaled via UE-specific dedicated RRC signaling. In another example, the indication can be explicitly included in a DCI format for an uplink grant. For instance, a bit value of 1 can be used to indicate that OFDMA is to be used, while a bit value of zero can be used to indicate that SC-FDMA is to be used.

Figure 11:
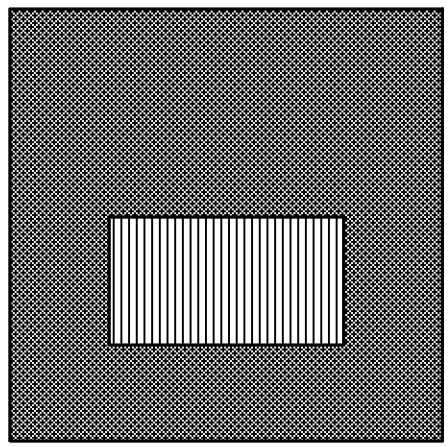
FIG. 11 illustrates a resource pattern of time (horizontal axis) and frequency (vertical axis) resources that can be allocated for an uplink transmission.

FIG. 11 illustrates a resource pattern 1100 of time (horizontal axis) and frequency (vertical axis) resources that can be allocated for an uplink transmission. The configuration of the resource pattern 100 can be provided via MIB signaling, SIB signaling, or UE-specific RRC signaling. The resource pattern may be used to implicitly signal an indication of whether SC-FDMA or OFDMA is to be used for uplink transmissions in the following manner. When a resource allocation in a DCI format for an uplink transmission is within the SC-FDMA transmission resource region, the UE can send the uplink transmission using SC-FDMA. Otherwise, if the resource allocation in the DCI format for the uplink transmission is in the resource region for OFDMA transmission, the UE can send the uplink transmission using OFDMA.

In some examples, there may be multiple indications of whether SC-FDMA or OFDMA is to be used; each indication may be for a specific physical channel so that different channels can apply different transmission schemes. In one example, an indication of whether to use SC-FDMA or OFDMA for the xPUCCH can be signaled (e.g., via UE-specific dedicated RRC signaling), while an indicator of whether to use SC-FDMA or OFDMA for the xPUSCH can also be signaled (e.g., in a DCI format for an uplink grant).

In general, a cellular base station can select an appropriate transmission scheme (e.g., SC-FDMA or OFDMA) based on a UE's measurement report (or other metrics) and the UE's capability to support a hybrid mode for uplink transmissions. However, in some examples, the UE can select the transmission scheme and send an indication of the selection to the cellular base station. In such examples, the UE can make the selection based on the downlink Reference Signal Received Power (RSRP) or a path loss measurement. The UE can then report the selection to the cellular base station in the Physical Random Access Channel (PRACH) through appropriate selection of a random access preamble signature. Alternatively, the UE can report the selection using a message 3 (RRC connection request) or a subsequent message in the Random Access Channel (RACH) procedure.

One potential issue that arises when a hybrid mode of uplink transmission is considered is how to handle the Direct Current (DC) subcarrier. In general, a DC subcarrier is not used to transmit data, but is used so that the center of an OFDM frequency band can be located. In the current LTE specification, the DC subcarrier is defined in the downlink to help solve problems with DC offset (the mean amplitude displacement from zero) and to allow direct conversion at a UE receiver. In the uplink, subcarriers are frequency shifted by half a subcarrier spacing (±7.5 kHz), resulting in an offset of 7.5 kHz relative to the DC subcarrier.

In order to allow a hybrid transmission mode of UL transmission to use both SC-FDMA and OFDMA, there are several approaches that may be used. In one example, the DC subcarrier can be defined in the uplink. The cellular base station can be precluded from scheduling uplink transmissions with SC-FDMA across the DC subcarrier. Hence, the cellular base station can be subject to a constraint when scheduling an uplink transmission that will use SC-FDMA.

In another example, when an uplink transmission using the SC-FDMA scheme is scheduled for the central Physical Resource Block (PRB), the UE can be configured to not to use the DC subcarrier for the uplink transmission. The UE can also apply rate matching or puncturing to the DC subcarrier for the uplink transmission. When rate matching is applied, the number of encoded bits after rate matching can be calculated according to the number of Resource Elements (REs) that are available (excluding REs that cross the DC subcarrier). When puncturing is applied, the number of encoded bits after rate matching can be calculated according to the total number of REs (including REs that cross the DC subcarrier). After rate matching and modulation, symbol puncturing can be performed on the REs that cross DC subcarriers.

Figure 12:
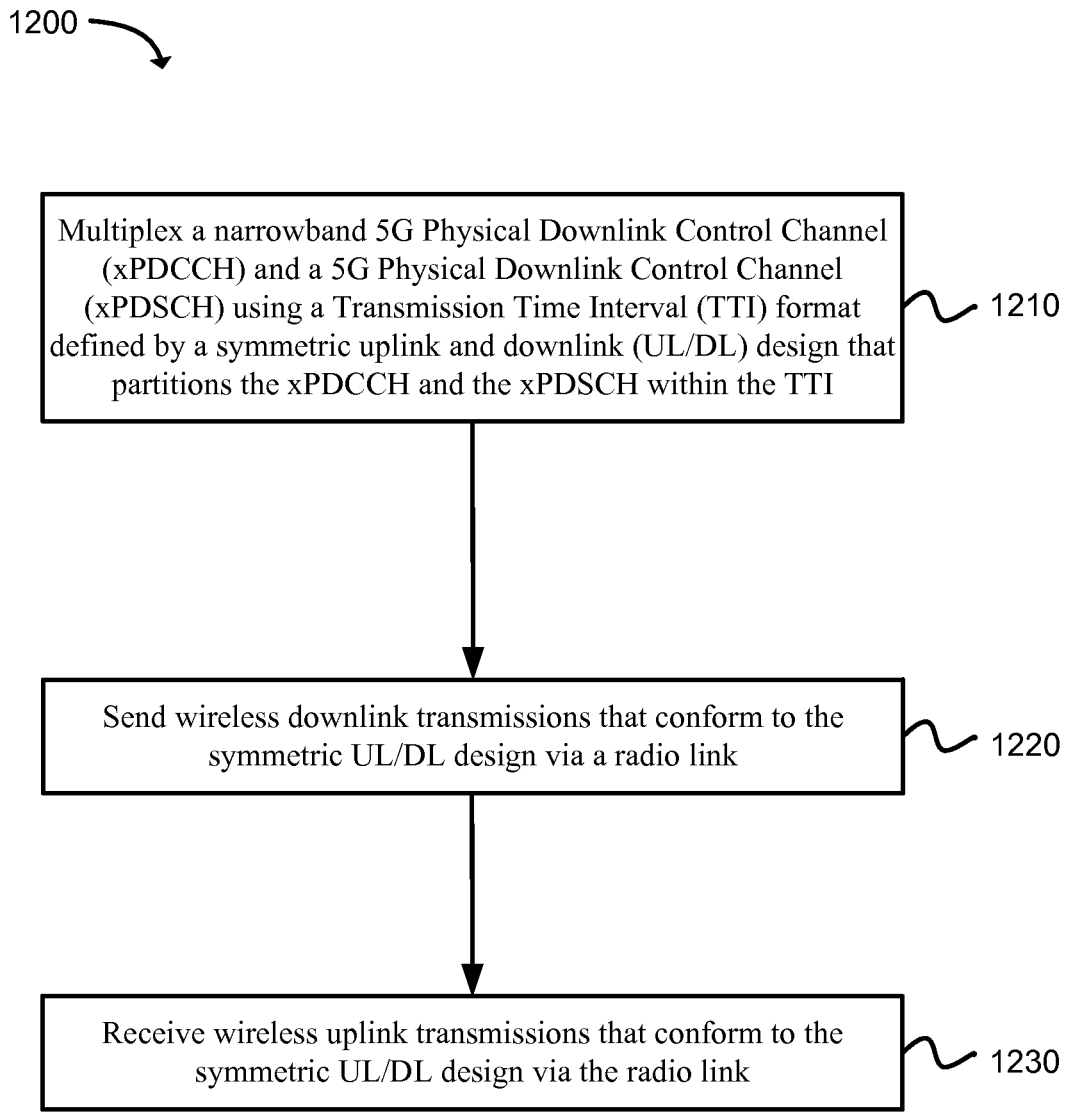
FIG. 12 illustrates functionality of a cellular base station (e.g., in a 5G wireless network) in accordance with an example.

FIG. 12 illustrates functionality 1200 of a cellular base station (e.g., in a 5G wireless network) in accordance with an example. The functionality can be implemented as a method or the functionality can be executed as instructions on a machine, where the instructions are included on at least one non-transitory computer-readable storage medium.

As in block 1210, the cellular base station can comprise circuitry configured to multiplex a narrowband 5G Physical Downlink Control Channel (xPDCCH) and a 5G Physical Downlink Control Channel (xPDSCH) using a Transmission Time Interval (TTI) format defined by a symmetric uplink and downlink (UL/DL) design that partitions the xPDCCH and the xPDSCH within the TTI. In one embodiment, the circuitry and comprise one or more processors and memory. The symmetric UL/DL design can define a Transmission Time Interval (TTI) format with control channels and data channels multiplexed using Frequency Division Multiplexing (FDM) or Time Division Multiplexing (TDM) to partition the control channels and the data channels within a Transmission Time Interval (TTI).

The symmetric UL/DL design can also define a unified waveform (e.g., SC-FDMA or OFDMA) that applies to both wireless downlink transmissions sent from the cellular base station and uplink transmissions received at the cellular base station.

As in block 1220, the circuitry can also be configured to send wireless downlink transmissions that conform to the symmetric UL/DL design via a radio link.

If FDM multiplexing is used, the circuitry (e.g., one or more processors and memory) of the cellular base station can also be configured to multiplex a narrowband 5G Physical Downlink Control Channel (xPDCCH) and a 5G Physical Downlink Control Channel (xPDSCH) in an FDM manner. In addition, the circuitry can be configured to receive a symmetric uplink transmission with a 5G Physical Uplink Control Channel (xPUCCH) and a 5G Physical Uplink Shared Channel (xPUSCH) multiplexed in an FDM manner. The circuitry can be configured to support both a localized transmission mode for the xPDCCH and a distributed transmission mode for the xPDCCH. The circuitry can also be configured to select either the localized transmission mode or the distributed transmission mode to be used for the radio link and to notify the UE of the selection using one or more of: master information block (MIB) signaling, system information block (SIB) signaling, or user-equipment (UE)-specific dedicated radio-resource-control (RRC) signaling.

The circuitry can also be configured to allocate time resources and frequency resources for the xPDCCH using one or more of: a master information block (MIB), a system information block (SIB), or user-equipment (UE)-specific dedicated radio-resource-control (RRC) signaling.

If TDM multiplexing is used, the circuitry of the cellular base station can be configured to multiplex a 5G Physical Downlink Control Channel (xPDCCH) and a 5G Physical Downlink Control Channel (xPDSCH) in a TDM manner and to receive a symmetric uplink transmission with a 5G Physical Uplink Control Channel (xPUCCH) and a 5G Physical Uplink Shared Channel (xPUSCH) multiplexed in a TDM manner.

In addition, if TDM multiplexing is used, the circuitry can be configured to partition Transmission Time Intervals (TTIs) for the radio link such that each TTI comprises: a downlink control information (DCI) region reserved for the xPDCCH, an uplink control region (UCI) reserved for the xPUCCH, a symmetric uplink/downlink (UL/DL) data region, and guard bands separating the DCI region, the UCI region, and the symmetric UL/DL data region. The circuitry can also be configured to dynamically assign the symmetric UL/DL region to be used for one of: the xPDSCH, the xPUSCH, or an almost blank subframe (ABS). The circuitry can also be configured to semi-statically configure a length of the DCI region, a length of the UCI region, or a length of the symmetric UL/DL region using one or more of: master information block (MIB) signaling, system information block (SIB) signaling, or user-equipment (UE)-specific dedicated radio-resource-control (RRC) signaling. The circuitry can also be configured to dynamically indicate a length of the DCI region, a length of the UCI region, or a length of the symmetric UL/DL region using physical layer signaling.

Alternatively, if TDM multiplexing is used, the circuitry of the cellular base station can be configured to partition Transmission Time Intervals (TTIs) for the radio link such that each TTI has a symmetric uplink/downlink (UL/DL)-region and at least one of a downlink control information (DCI) region reserved for the xPDCCH or an uplink control region (UCI) reserved for the xPUCCH, but not both. The circuitry can also be configured to dynamically assign the symmetric UL/DL region to be used for one of: the xPDSCH, the xPUSCH, or an almost blank subframe (ABS).

As in block 1230, the circuitry can also be configured to receive wireless uplink transmissions that conform to the symmetric UL/DL design via the radio link.

Figure 13:
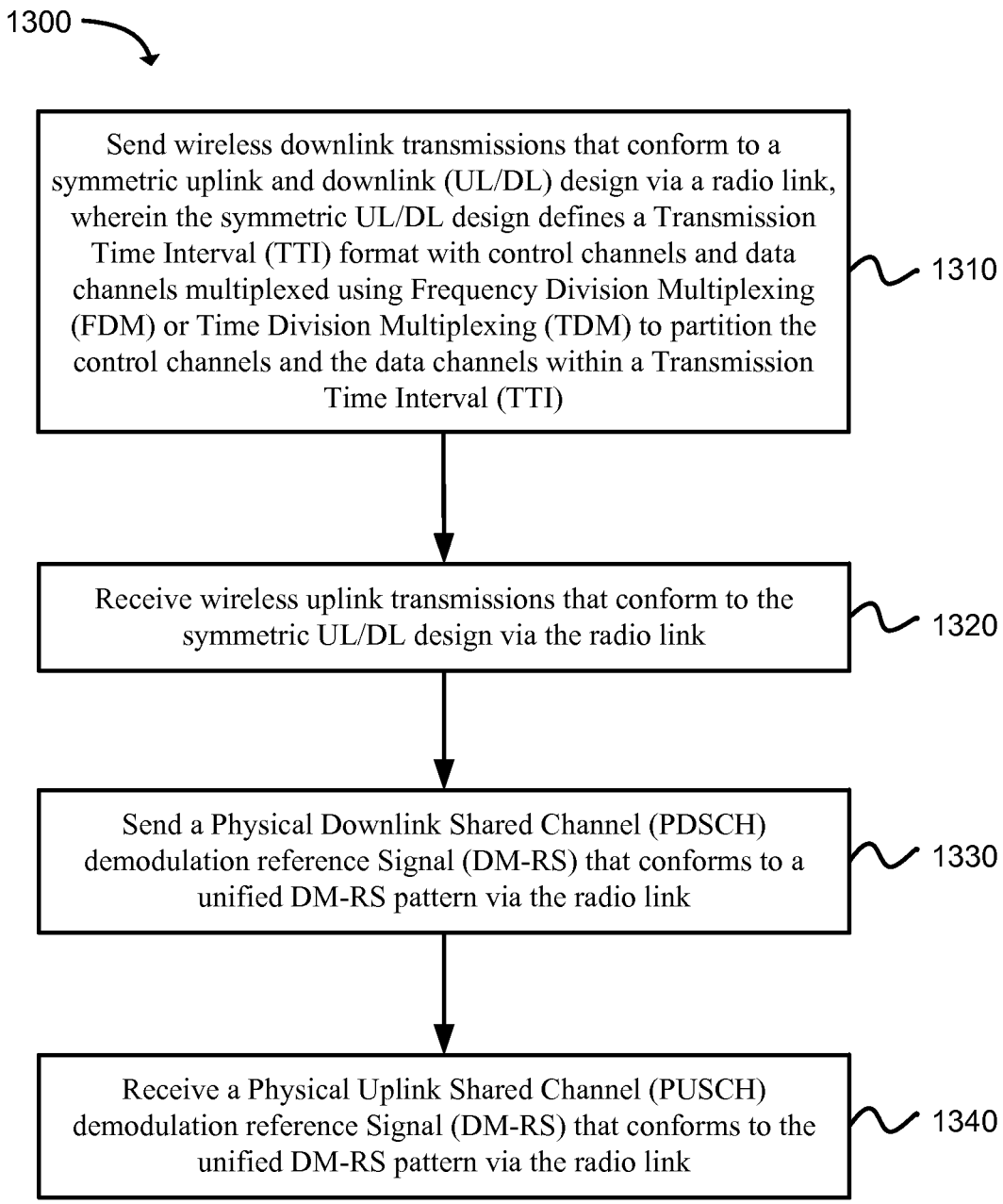
FIG. 13 illustrates functionality of a cellular base station (e.g., in a 5G wireless network) in accordance with an example.

FIG. 13 illustrates functionality 1300 of a cellular base station (e.g., in a 5G wireless network) in accordance with an example. The functionality can be implemented as a method or the functionality can be executed as instructions on a machine, where the instructions are included on at least one non-transitory computer-readable storage medium.

As in block 1310, wireless downlink transmissions that conform to a symmetric uplink and downlink (UL/DL) design can be sent via a radio link. The symmetric UL/DL design can define a Transmission Time Interval (TTI) format with control channels and data channels multiplexed using FDM or TDM to partition the control channels and the data channels within a TTI.

As in block 1320, wireless uplink transmissions that conform to the symmetric UL/DL design can be received via the radio link.

As in block 1330, a PDSCH DM-RS that conforms to a unified DM-RS pattern can be sent via the radio link. In some examples, a PDCCH DM-RS that conforms to the unified DM-RS pattern can also be sent via the radio link.

In one example, the unified DM-RS pattern can conform to PDSCH transmission mode (TMs) 9 and PDSCH transmission mode 10 as defined in Third Generation Partnership Project (3GPP) Long Term Evolution (LTE) standard release 12.0 or an earlier LTE standard.

In another example, the PDSCH DM-RS can be sent in OFDM symbol index 2 and OFDM symbol index 3 of each slot within a Transmission Time Interval (TTI), wherein a frequency distance between DM-RS symbols is 3 subcarriers. Subcarriers can be spaced apart by a predefined number of kHz (e.g., 15 kHz). In another example, the PDSCH DM-RS can be sent in OFDM symbol index 3 and OFDM symbol index 4 of each slot within a TTI, wherein a frequency distance between DM-RS symbols is 3 subcarriers. In another example, send PDSCH DM-RS can be sent in OFDM symbol index 2 and OFDM symbol index 4 of each slot within a TTI, wherein a frequency distance between DM-RS symbols is 3 subcarriers.

In another example, the DM-RS can have a scattered structure and a frequency distance between DM-RS symbols can be 2 subcarriers. A cell-frequency shift can also be applied to the DM-RS. The cell frequency shift can be defined as $(N_{ID}^{cell} \bmod 3)$, where $N_{ID}^{cell}$ is a cell identifier (ID) of a cell that includes the cellular base station and mod is a modulus operator.

As in block 1340, a PUSCH DM-RS that conforms to the unified DM-RS pattern can be received via the radio link. In some examples, receive a PUCCH DM-RS that conforms to the unified DM-RS pattern can also be received via the radio link.

Figure 14:
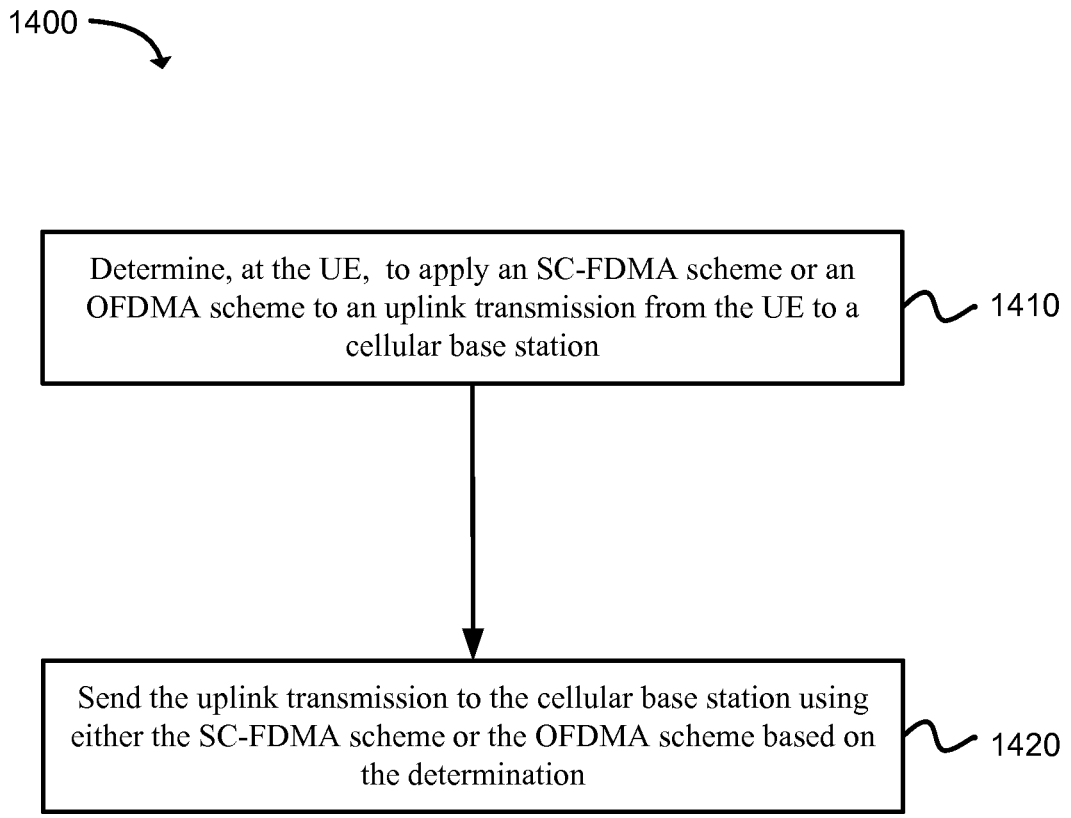
FIG. 14 illustrates functionality of a user equipment (UE) that supports both SC-FDMA and OFDMA for uplink transmissions in accordance with an example.

FIG. 14 illustrates functionality 1400 of a user equipment (UE) that supports both SC-FDMA and OFDMA for uplink transmissions in accordance with an example. The functionality can be implemented as a method or the functionality can be executed as instructions on a machine, where the instructions are included on at least one non-transitory computer-readable storage medium.

As in block 1410, a determination can be made at the UE to apply an SC-FDMA scheme or an OFDMA scheme to an uplink transmission from the UE to a cellular base station.

In one example, an indication of whether to apply the SC-FDMA scheme or the OFDMA scheme to the uplink transmission can be received via UE-specific dedicated Radio Resource Control (RRC) signaling from the cellular base station. In another example, an indication of whether to apply the SC-FDMA scheme or the OFDMA scheme to the uplink transmission can be received in a Downlink Control Information (DCI) format for an uplink grant from the cellular base station.

In another example, a configuration of an SC-FDMA resource region can be received from the cellular base station via Master Information Block (MIB), System Information Block (SIB), or UE-Specific Radio Resource Control (RRC) signaling. It can also be determined that resources allocated for the uplink transmission are included in the SC-FDMA resource region. In this manner, an indication of whether to apply the SC-FDMA scheme or the OFDMA scheme to the uplink transmission can implicitly communicated based on the SC-FDMA resource region. An uplink transmission can be sent to the cellular base station using the SC-FDMA scheme based on the determination.

In another example, a plurality of indications can be received from the cellular base station for a plurality of physical channels. Each indication in the plurality of indications can indicate whether to apply the SC-FDMA scheme or the OFDMA scheme to a respective physical channel in the plurality of physical channels.

In another example, the SC-FDMA scheme or the OFDMA scheme can be selected at the UE based on a measurement report for the UE or a UE capability to support a hybrid uplink mode. In another example, whether to apply the SC-FDMA scheme or the OFDMA scheme can be determined based on a reference signal received power (RSRP) measurement made at the UE, a path loss measurement made at the UE, a measurement report for the UE, or a UE capability to support a hybrid uplink mode. An indication of the determination can be sent to the cellular base station using a Physical Random Access Channel (PRACH) via a random access preamble signature or a Radio Resource Control (RRC) connection request.

As in block 1420, the uplink transmission can be sent from the UE to the cellular base station using either the SC-FDMA scheme or the OFDMA scheme based on the determination.

In one example, a Direct Current (DC) subcarrier for uplink transmissions can be identified, wherein the cellular base station is not permitted to schedule uplink transmissions with SC-FDMA across the DC subcarrier. The uplink transmission can be sent using resources (e.g., frequency resources) that do not overlap with the DC subcarrier when the SC-FDMA scheme is used for the uplink transmission.

Alternatively, in examples wherein the cellular base station is permitted to schedule uplink transmissions with SC-FDMA across the DC subcarrier, the uplink transmission can be sent, using the SC-FDMA scheme, in a central Physical Resource Block (PRB) without using the DC subcarrier by applying either rate matching or puncturing.

Figure 15:
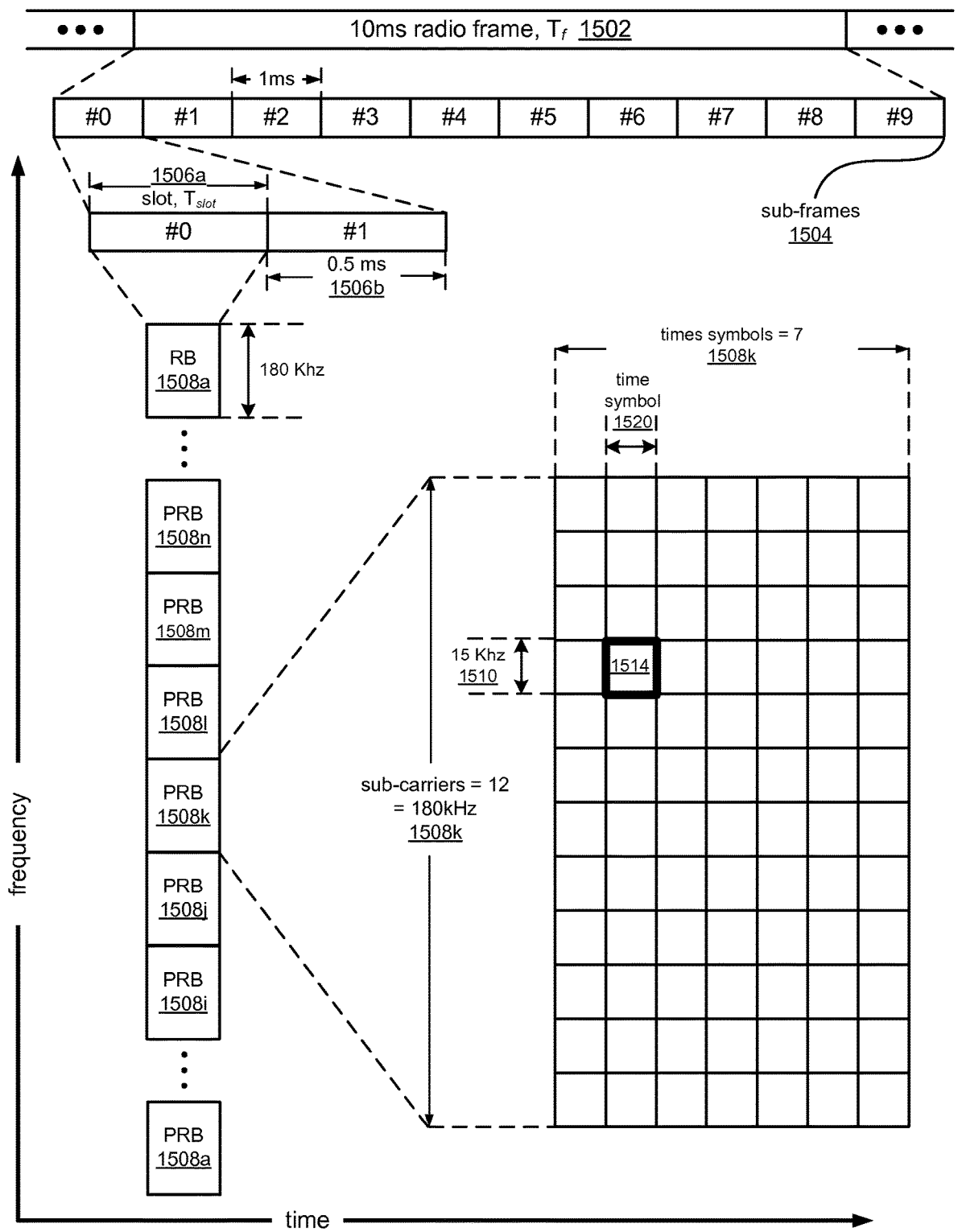
FIG. 15 is a block diagram illustrating a radio frame for an Orthogonal Frequency Division Multiplexing (OFDM) transmission scheme consistent with the Third Generation Partnership Project (3GPP) Long Term Evolution (LTE) standards and its constitutive elements with respect to both time and frequency.

FIG. 15 depicts constitutive elements, with respect to time and frequency, of the Orthogonal Frequency Division Multiplexing (OFDM) transmission scheme employed by the Third Generation Partnership Project (3GPP) Long Term Evolution (LTE) standard. However, other OFDM and non-OFDM modulation schemes are possible. With respect to time in the example, a single radio frame 1502, with a duration of 10 milliseconds (ms), is depicted from a stream of frames. The single radio frame comprises a set of 10 sub-frames 1504, numbered from #1 to #10 in the expanded cutout of the radio frame. Each sub-frame has a duration of 1 ms. A sub-frame can be further subdivided into two slots (#0 1506a, #1 1506b), a slot having a duration of 0.5 ms.

The 0.5 ms duration of a slot can coincide with the temporal duration of a physical resource block (PRB) 1508a-x. A PRB, as further defined in 3GPP TS 36.211, Sections 5.2.3 and 6.2.3, can be the smallest unit of resource allocation assigned by a transmission point scheduler unit within 3GPP LTE standards. Other standards can define analogous units, for purposes of resource assignment, with respect to time and frequency.

In addition to its 0.5 ms temporal span, a PRB also spans a range of frequencies. Individual PRBs have distinct frequency spans, as depicted by the ascending series of PRBs with respect to frequency in FIG. 15. More specifically, an individual PRB 1508a-x can include 12 different 15 kHz subcarriers 1510 (on the frequency axis) and 6 or 7 time symbols 1520 (on the time axis) per slot 1506, per subcarrier, depending on whether a normal Cyclic Prefix (CP), 7 time symbols, or an extended CP, 6 time symbols, is used. The various subcarriers and time symbols with respect to frequency and time dimensions can create a grid of 84 Resource Elements (REs) 1514, where a PRB 1508k comprises 7 time symbols.

Figure 16:
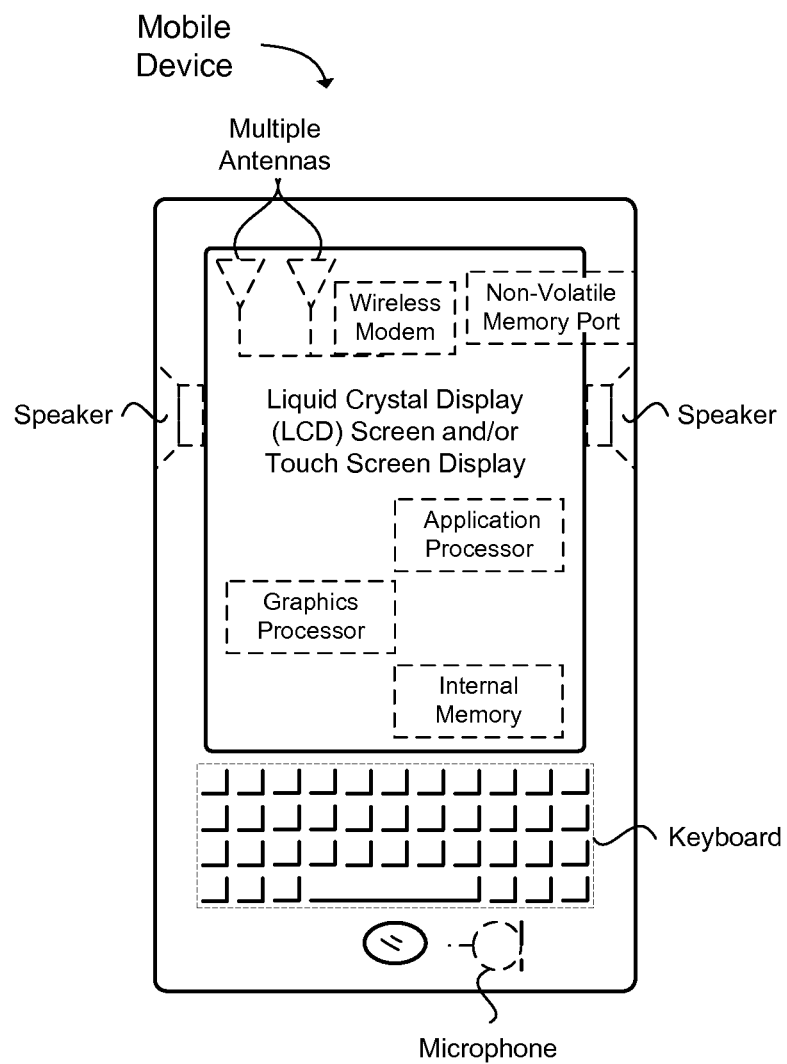
FIG. 16 provides an example illustration of a wireless device in accordance with an example.

FIG. 16 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 16 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Figure 17:
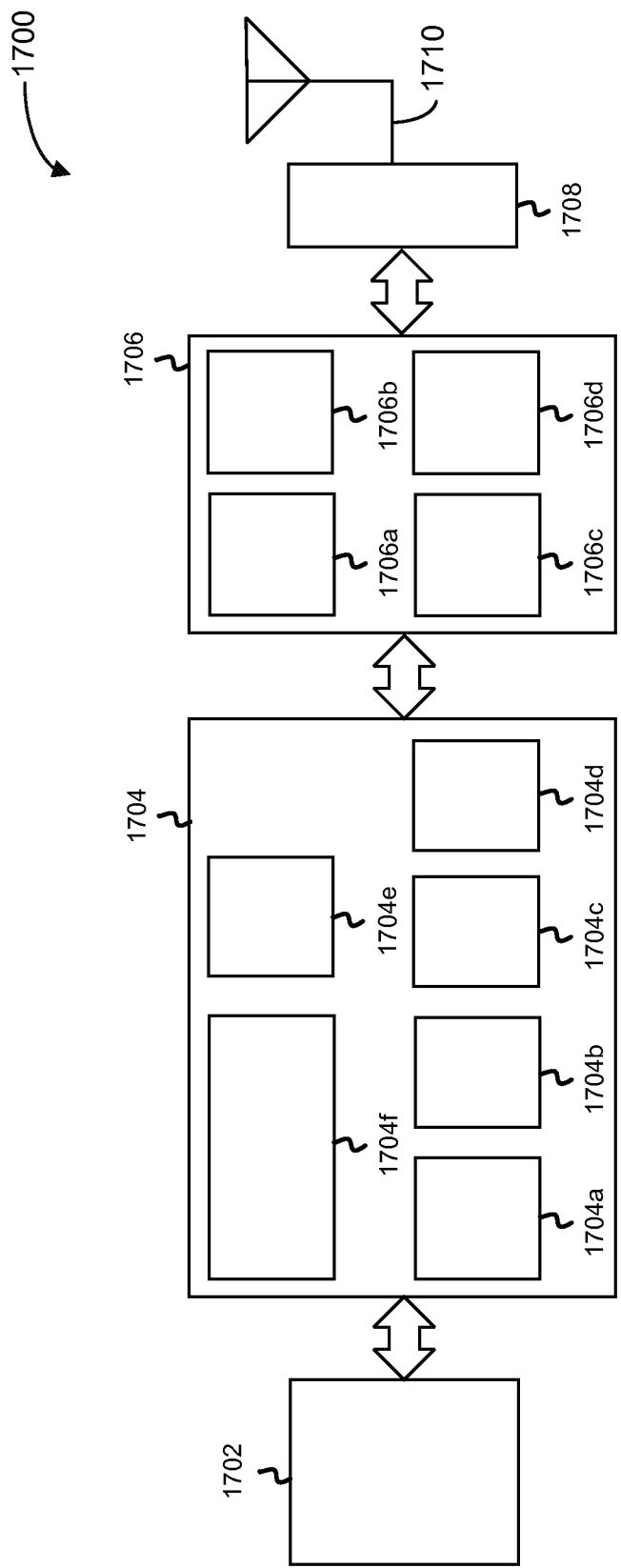
FIG. 17 provides an example illustration of a user equipment (UE) device.

FIG. 17 provides an example illustration of a user equipment (UE) device 1700, such as a wireless device, a mobile station (MS), a mobile wireless device, a mobile communication device, a tablet, a handset, or other type of wireless device. The UE device 1700 can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The UE device 1700 can be configured to communicate using at least one wireless communication standard such as, but not limited to, 3GPP LTE, WiMAX, High Speed Packet Access (HSPA), Bluetooth, and WiFi. The UE device 1700 can communicate using separate antennas for each wireless communication standard or shared antennas for multiple wireless communication standards. The UE device 1700 can communicate in a wireless local area network (WLAN), a wireless personal area network (WPAN), and/or a WWAN.

In some embodiments, the UE device 1700 may include application circuitry 1702, baseband circuitry 1704, Radio Frequency (RF) circuitry 1706, front-end module (FEM) circuitry 1708 and one or more antennas 1710, coupled together at least as shown.

The application circuitry 1702 may include one or more application processors. For example, the application circuitry 1702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1704 may include circuitry such as, but not limited to, one or more single-core or multi-core processors. The baseband circuitry 1704 may include one or more baseband processors and/or control logic to process baseband signals received from a receive signal path of the RF circuitry 1706 and to generate baseband signals for a transmit signal path of the RF circuitry 1706. Baseband processing circuitry 1704 may interface with the application circuitry 1702 for generation and processing of the baseband signals and for controlling operations of the RF circuitry 1706. For example, in some embodiments, the baseband circuitry 1704 may include a second generation (2G) baseband processor 1704*a*, third generation (3G) baseband processor 1704*b*, fourth generation (4G) baseband processor 1704*c*, and/or other baseband processor(s) 1704*d* for other existing generations, generations in development or to be developed in the future (e.g., fifth generation (5G), 6G, etc.). The baseband circuitry 1704 (e.g., one or more of baseband processors 1704*a-d*) may handle various radio control functions that enable communication with one or more radio networks via the RF circuitry 1706. The radio control functions may include, but are not limited to, signal modulation/demodulation, encoding/decoding, radio frequency shifting, etc. In some embodiments, modulation/demodulation circuitry of the baseband circuitry 1704 may include Fast-Fourier Transform (FFT), precoding, and/or constellation mapping/demapping functionality. In some embodiments, encoding/decoding circuitry of the baseband circuitry 1704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1704*e* of the baseband circuitry 1704 may be configured to run elements of the protocol stack for signaling of the PHY, MAC, RLC, PDCP and/or RRC layers. In some embodiments, the baseband circuitry may include one or more audio digital signal processor(s) (DSP) 1704*f*. The audio DSP(s) 1704*f* may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1704 and the application circuitry 1702 may be implemented together such as, for example, on a system on a chip (SOC).

In some embodiments, the baseband circuitry 1704 may provide for communication compatible with one or more radio technologies. For example, in some embodiments, the baseband circuitry 1704 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1704 is configured to support radio communications of more than one wireless protocol may be referred to as multi-mode baseband circuitry.

The RF circuitry 1706 may enable communication with wireless networks using modulated electromagnetic radiation through a non-solid medium. In various embodiments, the RF circuitry 1706 may include switches, filters, amplifiers, etc. to facilitate the communication with the wireless network. RF circuitry 1706 may include a receive signal path which may include circuitry to down-convert RF signals received from the FEM circuitry 1708 and provide baseband signals to the baseband circuitry 1704. RF circuitry 1706 may also include a transmit signal path which may include circuitry to up-convert baseband signals provided by the baseband circuitry 1704 and provide RF output signals to the FEM circuitry 1708 for transmission.

In some embodiments, the RF circuitry 1706 may include a receive signal path and a transmit signal path. The receive signal path of the RF circuitry 1706 may include mixer circuitry 1706*a*, amplifier circuitry 1706*b* and filter circuitry 1706*c*. The transmit signal path of the RF circuitry 1706 may include filter circuitry 1706*c* and mixer circuitry 1706*a*. RF circuitry 1706 may also include synthesizer circuitry 1706*d* for synthesizing a frequency for use by the mixer circuitry 1706*a* of the receive signal path and the transmit signal path. In some embodiments, the mixer circuitry 1706*a* of the receive signal path may be configured to down-convert RF signals received from the FEM circuitry 1708 based on the synthesized frequency provided by synthesizer circuitry 1706*d*. The amplifier circuitry 1706*b* may be configured to amplify the down-converted signals and the filter circuitry 1706*c* may be a low-pass filter (LPF) or band-pass filter (BPF) configured to remove unwanted signals from the down-converted signals to generate output baseband signals. Output baseband signals may be provided to the baseband circuitry 1704 for further processing. In some embodiments, the output baseband signals may be zero-frequency baseband signals, although this is not a requirement. In some embodiments, mixer circuitry 1706*a* of the receive signal path may comprise passive mixers, although the scope of the embodiments is not limited in this respect.

In some embodiments, the mixer circuitry 1706*a* of the transmit signal path may be configured to up-convert input baseband signals based on the synthesized frequency provided by the synthesizer circuitry 1706*d* to generate RF output signals for the FEM circuitry 1708. The baseband signals may be provided by the baseband circuitry 1704 and may be filtered by filter circuitry 1706*c*. The filter circuitry 1706*c* may include a low-pass filter (LPF), although the scope of the embodiments is not limited in this respect.

In some embodiments, the mixer circuitry 1706*a* of the receive signal path and the mixer circuitry 1706*a* of the transmit signal path may include two or more mixers and may be arranged for quadrature down-conversion and/or up-conversion respectively. In some embodiments, the mixer circuitry 1706a of the receive signal path and the mixer circuitry 1706a of the transmit signal path may include two or more mixers and may be arranged for image rejection (e.g., Hartley image rejection). In some embodiments, the mixer circuitry 1706a of the receive signal path and the mixer circuitry 1706a may be arranged for direct down-conversion and/or direct up-conversion, respectively. In some embodiments, the mixer circuitry 1706a of the receive signal path and the mixer circuitry 1706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1706 may include analog-to-digital converter (ADC) and digital-to-analog converter (DAC) circuitry and the baseband circuitry 1704 may include a digital baseband interface to communicate with the RF circuitry 1706.

In some dual-mode embodiments, a separate radio IC circuitry may be provided for processing signals for each spectrum, although the scope of the embodiments is not limited in this respect.

In some embodiments, the synthesizer circuitry 1706d may be a fractional-N synthesizer or a fractional N/N+1 synthesizer, although the scope of the embodiments is not limited in this respect as other types of frequency synthesizers may be suitable. For example, synthesizer circuitry 1706d may be a delta-sigma synthesizer, a frequency multiplier, or a synthesizer comprising a phase-locked loop with a frequency divider.

The synthesizer circuitry 1706d may be configured to synthesize an output frequency for use by the mixer circuitry 1706a of the RF circuitry 1706 based on a frequency input and a divider control input. In some embodiments, the synthesizer circuitry 1706d may be a fractional N/N+1 synthesizer.

In some embodiments, frequency input may be provided by a voltage controlled oscillator (VCO), although that is not a requirement. Divider control input may be provided by either the baseband circuitry 1704 or the applications processor 1702 depending on the desired output frequency. In some embodiments, a divider control input (e.g., N) may be determined from a look-up table based on a channel indicated by the applications processor 1702.

Synthesizer circuitry 1706d of the RF circuitry 1706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1706 may include an IQ/polar converter.

FEM circuitry 1708 may include a receive signal path which may include circuitry configured to operate on RF signals received from one or more antennas 1710, amplify the received signals and provide the amplified versions of the received signals to the RF circuitry 1706 for further processing. FEM circuitry 1708 may also include a transmit signal path which may include circuitry configured to amplify signals for transmission provided by the RF circuitry 1706 for transmission by one or more of the one or more antennas 1710.

In some embodiments, the FEM circuitry 1708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1706). The transmit signal path of the FEM circuitry 1708 may include a power amplifier (PA) to amplify input RF signals (e.g., provided by RF circuitry 1706), and one or more filters to generate RF signals for subsequent transmission (e.g., by one or more of the one or more antennas 1710.

In some embodiments, the UE device 1700 may include additional elements such as, for example, memory/storage, display (e.g., touch screen), camera, antennas, keyboard, microphone, speakers, sensor, and/or input/output (I/O) interface.

EXAMPLES

The following examples pertain to specific embodiments and point out specific features, elements, or steps that can be used or otherwise combined in achieving such embodiments.

Example 1 includes a cellular base station in a fifth-generation (5G) wireless network, the cellular base station comprising circuitry (e.g., one or more processors and memory) configured to: multiplex a 5G Physical Downlink Control Channel (xPDCCH) and a 5G Physical Downlink Control Channel (xPDSCH) using a Transmission Time Interval (TTI) format defined by a symmetric uplink and downlink (UL/DL) design that partitions the xPDCCH and the xPDSCH within the TTI; send wireless downlink transmissions that conform to the symmetric UL/DL design via a radio link; and receive wireless uplink transmissions that conform to the symmetric UL/DL design via the radio link.

Example 2 includes the cellular base station of example 1, wherein the circuitry is further configured to: multiplex the 5G Physical Downlink Control Channel (xPDCCH) and the 5G Physical Downlink Control Channel (xPDSCH) in a Frequency-Division Multiplexing (FDM) manner; receive a symmetric uplink transmission with a 5G Physical Uplink Control Channel (xPUCCH) and a 5G Physical Uplink Shared Channel (xPUSCH) multiplexed in a FDM manner; support both a localized transmission mode for the xPDCCH and a distributed transmission mode for the xPDCCH; select either the localized transmission mode or the distributed transmission mode to be used for the radio link; notify the UE of the selection using one or more of: master information block (MIB) signaling, system information block (SIB) signaling, or user-equipment (UE)-specific dedicated radio-resource-control (RRC) signaling; and allocate time resources and frequency resources for the xPDCCH using one or more of: a master information block (MIB), a system information block (SIB), or user-equipment (UE)-specific dedicated radio-resource-control (RRC) signaling.

Example 3 includes the cellular base station of example 1, wherein the circuitry is further configured to: multiplex the 5G Physical Downlink Control Channel (xPDCCH) and the 5G Physical Downlink Control Channel (xPDSCH) in a Time-Division Multiplexing (TDM) manner; receive a symmetric uplink transmission with a 5G Physical Uplink Control Channel (xPUCCH) and a 5G Physical Uplink Shared Channel (xPUSCH) multiplexed in a TDM manner; partition Transmission Time Intervals (TTIs) for the radio link such that each TTI comprises: a downlink control information (DCI) region reserved for the xPDCCH, an uplink control region (UCI) reserved for the xPUCCH, a symmetric uplink/downlink (UL/DL) data region, and guard bands separating the DCI region, the UCI region, and the symmetric UL/DL data region; and dynamically assign the symmetric UL/DL region to be used for one of: the xPDSCH, the xPUSCH, or an almost blank subframe (ABS).

Example 4 includes the cellular base station of example 3, wherein the circuitry is further configured to: semi-statically configure a length of the DCI region, a length of the UCI region, or a length of the symmetric UL/DL region using one or more of: master information block (MIB) signaling, system information block (SIB) signaling, or user-equipment (UE)-specific dedicated radio-resource-control (RRC) signaling.

Example 5 includes the cellular base station of example 3, wherein the circuitry is further configured to: dynamically indicate a length of the DCI region, a length of the UCI region, or a length of the symmetric UL/DL region using physical layer signaling.

Example 6 includes the cellular base station of example 1, wherein the circuitry is further configured to: multiplex the 5G Physical Downlink Control Channel (xPDCCH) and the 5G Physical Downlink Control Channel (xPDSCH) in a Time-Division Multiplexing (TDM) manner; receive a symmetric uplink transmission with a 5G Physical Uplink Control Channel (xPUCCH) and a 5G Physical Uplink Shared Channel (xPUSCH) multiplexed in a TDM manner; partition Transmission Time Intervals (TTIs) for the radio link such that each TTI has a symmetric uplink/downlink (UL/DL)-region and at least one of a downlink control information (DCI) region reserved for the xPDCCH or an uplink control region (UCI) reserved for the xPUCCH, but not both; and dynamically assign the symmetric UL/DL region to be used for one of: the xPDSCH, the xPUSCH, or an almost blank subframe (ABS).

Example 7 includes a cellular base station in a fifth-generation (5G) wireless network, the cellular base station comprising circuitry (e.g., one or more processors and memory) configured to: send wireless downlink transmissions that conform to a symmetric uplink and downlink (UL/DL) design via a radio link, wherein the symmetric UL/DL design defines a Transmission Time Interval (TTI) format with control channels and data channels multiplexed using Frequency Division Multiplexing (FDM) or Time Division Multiplexing (TDM) to partition the control channels and the data channels within a Transmission Time Interval (TTI); receive wireless uplink transmissions that conform to the symmetric UL/DL design via the radio link; send a Physical Downlink Shared Channel (PDSCH) demodulation reference Signal (DM-RS) that conforms to a unified DM-RS pattern via the radio link; receive a Physical Uplink Shared Channel (PUSCH) demodulation reference Signal (DM-RS) that conforms to the unified DM-RS pattern via the radio link; send a Physical Downlink Control Channel (PDCCH) demodulation reference Signal (DM-RS) that conforms to the unified DM-RS pattern via the radio link; and receive a Physical Uplink Control Channel (PUCCH) demodulation reference Signal (DM-RS) that conforms to the unified DM-RS pattern via the radio link.

Example 8 includes the cellular base station of example 7, wherein the circuitry is further configured to: send the PDSCH DM-RS in two Orthogonal-Frequency-Division-Multiplexing (OFDM) symbol indices—selected from the list of OFDM symbol indices consisting of OFDM symbol index 2, OFDM symbol index 3, and OFDM symbol index 4—of each slot within a Transmission Time Interval (TTI), wherein a frequency distance between DM-RS symbols is 3 subcarriers.

Example 9 includes the cellular base station of example 7, wherein the DM-RS has a scattered structure and a frequency distance between DM-RS symbols is 2 subcarriers, and wherein the circuitry is further configured to: apply a cell-frequency shift to the DM-RS, the cell frequency shift being defined as $(N_{ID}^{cell} \bmod 3)$, where $N_{ID}^{cell}$ is a cell identifier (ID) of a cell that includes the cellular base station and mod is a modulus operator.

Example 10 includes a user equipment (UE) that supports both Single-Carrier Frequency-Division Multiple Access (SC-FDMA) and Orthogonal Frequency-Division Multiple Access (OFDMA) for uplink transmissions, the UE comprising circuitry (e.g., one or more processors and memory) configured to: determine, at the UE, to apply an SC-FDMA scheme or an OFDMA scheme to an uplink transmission from the UE to a cellular base station; and send the uplink transmission to the cellular base station using either the SC-FDMA scheme or the OFDMA scheme based on the determination.

Example 11 includes the UE of example 10, wherein the circuitry is further configured to receive, via UE-specific dedicated Radio Resource Control (RRC) signaling from the cellular base station or in a Downlink Control Information (DCI) format for an uplink grant from the cellular base station, an indication of whether to apply the SC-FDMA scheme or the OFDMA scheme to the uplink transmission.

Example 12 includes the UE of example 10, wherein the circuitry is further configured to: receive a configuration of an SC-FDMA resource region from the cellular base station via Master Information Block (MIB), System Information Block (SIB), or UE-Specific Radio Resource Control (RRC) signaling; determine that resources allocated for the uplink transmission are included in the SC-FDMA resource region, wherein an indication of whether to apply the SC-FDMA scheme or the OFDMA scheme to the uplink transmission is implicitly communicated based on the SC-FDMA resource region; and send the uplink transmission to the cellular base station using the SC-FDMA scheme based on the determination.

Example 13 includes the UE of example 10, wherein the circuitry is further configured to: determine whether to apply the SC-FDMA scheme or the OFDMA scheme based on a reference signal received power (RSRP) measurement made at the UE, a path loss measurement made at the UE, a measurement report for the UE, or a UE capability to support a hybrid uplink mode; and send an indication of the determination to the cellular base station using a Physical Random Access Channel (PRACH) via a random access preamble signature or a Radio Resource Control (RRC) connection request.

Example 14 includes the UE of example 10, 11, 12, or 13, wherein the circuitry is further configured to: identify a Direct Current (DC) subcarrier for uplink transmissions, wherein the cellular base station is not permitted to schedule uplink transmissions with SC-FDMA across the DC subcarrier; and send the uplink transmission using resources that do not overlap with the DC subcarrier when the SC-FDMA scheme is used for the uplink transmission.

Example 15 includes the UE of example 10, 11, 12, or 13, wherein the circuitry is further configured to: identify a Direct Current (DC) subcarrier for uplink transmissions; and transmit the uplink transmission, using the SC-FDMA scheme, in a central Physical Resource Block (PRB) without using the DC subcarrier by applying either rate matching or puncturing.

Example 16 includes a cellular base station in a fifth-generation (5G) wireless network, the cellular base station comprising circuitry configured to: multiplex a 5G Physical Downlink Control Channel (xPDCCH) and a 5G Physical Downlink Control Channel (xPDSCH) using a Transmission Time Interval (TTI) format defined by a symmetric uplink and downlink (UL/DL) design that partitions the xPDCCH and the xPDSCH within the TTI; send wireless downlink transmissions that conform to the symmetric UL/DL design via a radio link; and receive wireless uplink transmissions that conform to the symmetric UL/DL design via the radio link.

Example 17 includes the cellular base station of example 16, wherein the symmetric UL/DL design defines a unified waveform that applies to both wireless downlink transmissions sent from the cellular base station and uplink transmissions received at the cellular base station.

Example 18 includes the cellular base station of example 16 or 17, wherein the circuitry is further configured to: multiplex the 5G Physical Downlink Control Channel (xPDCCH) and the 5G Physical Downlink Control Channel (xPDSCH) in a Frequency-Division Multiplexing (FDM) manner; and receive a symmetric uplink transmission with a 5G Physical Uplink Control Channel (xPUCCH) and a 5G Physical Uplink Shared Channel (xPUSCH) multiplexed in a FDM manner.

Example 19 includes the cellular base station of example 18, wherein the circuitry is further configured to support both a localized transmission mode for the xPDCCH and a distributed transmission mode for the xPDCCH.

Example 20 includes the cellular base station of example 19, wherein the circuitry is further configured to: select either the localized transmission mode or the distributed transmission mode to be used for the radio link; and notify the UE of the selection using one or more of: master information block (MIB) signaling, system information block (SIB) signaling, or user-equipment (UE)-specific dedicated radio-resource-control (RRC) signaling.

Example 21 includes the cellular base station of example 19, wherein the circuitry is further configured to: allocate time resources and frequency resources for the xPDCCH using one or more of: a master information block (MIB), a system information block (SIB), or user-equipment (UE)-specific dedicated radio-resource-control (RRC) signaling.

Example 22 includes the cellular base station of example 16 or 17, wherein the circuitry is further configured to: multiplex the 5G Physical Downlink Control Channel (xPDCCH) and the 5G Physical Downlink Control Channel (xPDSCH) in a Time-Division Multiplexing (TDM) manner; and receive a symmetric uplink transmission with a 5G Physical Uplink Control Channel (xPUCCH) and a 5G Physical Uplink Shared Channel (xPUSCH) multiplexed in a TDM manner.

Example 23 includes the cellular base station of example 22, wherein the circuitry is further configured to: partition Transmission Time Intervals (TTIs) for the radio link such that each TTI comprises: a downlink control information (DCI) region reserved for the xPDCCH, an uplink control region (UCI) reserved for the xPUCCH, a symmetric uplink/downlink (UL/DL) data region, and guard bands separating the DCI region, the UCI region, and the symmetric UL/DL data region; and dynamically assign the symmetric UL/DL region to be used for one of: the xPDSCH, the xPUSCH, or an almost blank subframe (ABS).

Example 24 includes the cellular base station of example 23, wherein the circuitry is further configured to: semi-statically configure a length of the DCI region, a length of the UCI region, or a length of the symmetric UL/DL region using one or more of: master information block (MIB) signaling, system information block (SIB) signaling, or user-equipment (UE)-specific dedicated radio-resource-control (RRC) signaling.

Example 25 includes the cellular base station of example 23, wherein the circuitry is further configured to: dynamically indicate a length of the DCI region, a length of the UCI region, or a length of the symmetric UL/DL region using physical layer signaling.

Example 26 includes the cellular base station of example 22, wherein the circuitry is further configured to: partition Transmission Time Intervals (TTIs) for the radio link such that each TTI has a symmetric uplink/downlink (UL/DL)-region and at least one of a downlink control information (DCI) region reserved for the xPDCCH or an uplink control region (UCI) reserved for the xPUCCH, but not both; and dynamically assign the symmetric UL/DL region to be used for one of: the xPDSCH, the xPUSCH, or an almost blank subframe (ABS).

Example 27 includes a cellular base station in a fifth-generation (5G) wireless network, the cellular base station comprising circuitry configured to: send wireless downlink transmissions that conform to a symmetric uplink and downlink (UL/DL) design via a radio link, wherein the symmetric UL/DL design defines a Transmission Time Interval (TTI) format with control channels and data channels multiplexed using Frequency Division Multiplexing (FDM) or Time Division Multiplexing (TDM) to partition the control channels and the data channels within a Transmission Time Interval (TTI); receive wireless uplink transmissions that conform to the symmetric UL/DL design via the radio link; send a Physical Downlink Shared Channel (PDSCH) demodulation reference Signal (DM-RS) that conforms to a unified DM-RS pattern via the radio link; and receive a Physical Uplink Shared Channel (PUSCH) demodulation reference Signal (DM-RS) that conforms to the unified DM-RS pattern via the radio link.

Example 28 includes the cellular base station of example 27, wherein the circuitry is further configured to: send a Physical Downlink Control Channel (PDCCH) demodulation reference Signal (DM-RS) that conforms to the unified DM-RS pattern via the radio link; and receive a Physical Uplink Control Channel (PUCCH) demodulation reference Signal (DM-RS) that conforms to the unified DM-RS pattern via the radio link.

Example 29 includes the cellular base station of example 27 or 28, wherein the unified DM-RS pattern conforms to PDSCH transmission mode (TMs) 9 and PDSCH transmission mode 10 as defined in Third Generation Partnership Project (3GPP) Long Term Evolution (LTE) standard release 12.0 or an earlier LTE standard.

Example 30 includes the cellular base station of example 27 or 28, wherein the circuitry is further configured to: send the PDSCH DM-RS in Orthogonal-Frequency-Division-Multiplexing (OFDM) symbol index 2 and OFDM symbol index 3 of each slot within a Transmission Time Interval (TTI), wherein a frequency distance between DM-RS symbols is 3 subcarriers.

Example 31 includes the cellular base station of example 27 or 28, wherein the circuitry is further configured to: send the PDSCH DM-RS in Orthogonal-Frequency-Division-Multiplexing (OFDM) symbol index 3 and OFDM symbol index 4 of each slot within a Transmission Time Interval (TTI), wherein a frequency distance between DM-RS symbols is 3 subcarriers.

Example 32 includes the cellular base station of example 27 or 28, wherein the circuitry is further configured to: send the PDSCH DM-RS in Orthogonal-Frequency-Division-Multiplexing (OFDM) symbol index 2 and OFDM symbol index 4 of each slot within a Transmission Time Interval (TTI), wherein a frequency distance between DM-RS symbols is 3 subcarriers.

Example 33 includes the cellular base station of example 27 or 28, wherein the DM-RS has a scattered structure and a frequency distance between DM-RS symbols is 2 subcarriers.

Example 34 includes the cellular base station of example 33, wherein the circuitry is further configured to: apply a cell-frequency shift to the DM-RS, the cell frequency shift being defined as $(N_{ID}^{cell} \mod 3)$, where $N_{ID}^{cell}$ is a cell identifier (ID) of a cell that includes the cellular base station and mod is a modulus operator.

Example 35 includes a user equipment (UE) that supports both Single-Carrier Frequency-Division Multiple Access (SC-FDMA) and Orthogonal Frequency-Division Multiple Access (OFDMA) for uplink transmissions, the UE comprising circuitry configured to determine, at the UE, to apply an SC-FDMA scheme or an OFDMA scheme to an uplink transmission from the UE to a cellular base station; and send the uplink transmission to the cellular base station using either the SC-FDMA scheme or the OFDMA scheme based on the determination.

Example 36 includes the UE of example 35, wherein the circuitry is configured to receive, via UE-specific dedicated Radio Resource Control (RRC) signaling from the cellular base station, an indication of whether to apply the SC-FDMA scheme or the OFDMA scheme to the uplink transmission.

Example 37 includes the UE of example 35, wherein the circuitry is further configured to receive, in a Downlink Control Information (DCI) format for an uplink grant from the cellular base station, an indication of whether to apply the SC-FDMA scheme or the OFDMA scheme to the uplink transmission.

Example 38 includes the UE of example 35, wherein the circuitry is further configured to: receive a configuration of an SC-FDMA resource region from the cellular base station via Master Information Block (MIB), System Information Block (SIB), or UE-Specific Radio Resource Control (RRC) signaling; determine that resources allocated for the uplink transmission are included in the SC-FDMA resource region, wherein an indication of whether to apply the SC-FDMA scheme or the OFDMA scheme to the uplink transmission is implicitly communicated based on the SC-FDMA resource region; and send the uplink transmission to the cellular base station using the SC-FDMA scheme based on the determination.

Example 39 includes the UE of example 35, 36, 37, or 38, wherein the circuitry is further configured to: receive a plurality of indications from the cellular base station for a plurality of physical channels, wherein each indication in the plurality of indications indicates whether to apply the SC-FDMA scheme or the OFDMA scheme to a respective physical channel in the plurality of physical channels.

Example 40 includes the UE of example 35, wherein the circuitry is further configured to: select the SC-FDMA scheme or the OFDMA scheme at the UE based on a measurement report for the UE or a UE capability to support a hybrid uplink mode.

Example 41 includes the UE of example 35, wherein the circuitry is further configured to: determine whether to apply the SC-FDMA scheme or the OFDMA scheme based on a reference signal received power (RSRP) measurement made at the UE or a path loss measurement made at the UE; and send an indication of the determination to the cellular base station using a Physical Random Access Channel (PRACH) via a random access preamble signature or a Radio Resource Control (RRC) connection request.

Example 42 includes the UE of examples 35, 36, 37, 38, 39, 40, or 41, wherein the circuitry is further configured to: identify a Direct Current (DC) subcarrier for uplink transmissions, wherein the cellular base station is not permitted to schedule uplink transmissions with SC-FDMA across the DC subcarrier; and send the uplink transmission using resources that do not overlap with the DC subcarrier when the SC-FDMA scheme is used for the uplink transmission.

Example 43 includes the UE of examples 35, 36, 37, 38, 39, 40, or 41, wherein the circuitry is further configured to: identify a Direct Current (DC) subcarrier for uplink transmissions; and transmit the uplink transmission, using the SC-FDMA scheme, in a central Physical Resource Block (PRB) without using the DC subcarrier by applying either rate matching or puncturing.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages may be added to the logical flow for enhanced utility, accounting, performance, measurement, troubleshooting, or other purposes.

As used herein, the word "or" indicates an inclusive disjunction. For example, as used herein, the phrase "A or B" represents an inclusive disjunction of exemplary conditions A and B. Hence, "A or B" is false only if both condition A is false and condition B is false. When condition A is true and condition B is also true, "A or B" is also true. When condition A is true and condition B is false, "A or B" is true. When condition B is true and condition A is false, "A or B" is true. In other words, the term "or," as used herein, should not be construed as an exclusive disjunction. The term "xor" is used where an exclusive disjunction is intended.

As used herein, the term processor can include general-purpose processors, specialized processors such as VLSI, FPGAs, and other types of specialized processors, as well as base-band processors used in transceivers to send, receive, and process wireless communications.

It should be understood that many of the functional units described in this specification have been labeled as modules, in order to more particularly emphasize their implementation independence. For example, a module can be implemented as a hardware circuit (e.g., an application-specific integrated circuit (ASIC)) comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples can be referred to herein along with alternatives for the various components thereof. It is understood that such embodiments, examples, and alternatives are not to be construed as de facto equivalents of one another, but are to be considered as separate and autonomous.

Furthermore, the described features, structures, or characteristics can be combined in any suitable manner in one or more embodiments. In the foregoing description, numerous specific details are provided, such as examples of layouts, distances, network examples, etc., to provide a thorough understanding of some embodiments. One skilled in the relevant art will recognize, however, that the some embodiments can be practiced without one or more of the specific details, or with other methods, components, layouts, etc. In other instances, well-known structures, materials, or operations are not shown or described in detail to avoid obscuring aspects of different embodiments.

While the forgoing examples are illustrative of the principles used in various embodiments in one or more particular applications, it will be apparent to those of ordinary skill in the art that numerous modifications in form, usage and details of implementation can be made without the exercise of inventive faculty, and without departing from the principles and concepts of the embodiments. Accordingly, it is not intended that the invention be limited, except as by the claims set forth below.

What is claimed is:

1. A cellular base station in a fifth-generation (5G) wireless network, the cellular base station comprising circuitry configured to:
   multiplex a 5G Physical Downlink Control Channel (xPDCCH) and a 5G Physical Downlink Shared Channel (xPDSCH) using a Transmission Time Interval (TTI)

format defined by a symmetric uplink and downlink (UL/DL) design that partitions the xPDCCH and the xPDSCH within the TTI;

send wireless downlink transmissions that conform to the symmetric UL/DL design via a radio link; and receive wireless uplink transmissions that conform to the symmetric UL/DL design via the radio link, wherein the symmetric UL/DL design defines a unified waveform that applies to both wireless downlink transmissions sent from the cellular base station and uplink transmissions received at the cellular base station using one or more of frequency-division duplexing (FDD) or time-division duplexing (TDD), and wherein the unified waveform has a same multiple access type that applies to both the wireless downlink transmission sent from the cellular base station and the uplink transmissions received at the cellular base station.

2. The cellular base station of claim 1, wherein the circuitry is further configured to:

multiplex the 5G Physical Downlink Control Channel (xPDCCH) and the 5G Physical Downlink Control Channel (xPDSCH) in a Frequency-Division Multiplexing (FDM) manner; and receive a symmetric uplink transmission with a 5G Physical Uplink Control Channel (xPUCCH) and a 5G Physical Uplink Shared Channel (xPUSCH) multiplexed in a FDM manner.

3. The cellular base station of claim 2, wherein the circuitry is further configured to support both a localized transmission mode for the xPDCCH and a distributed transmission mode for the xPDCCH.

4. The cellular base station of claim 3, wherein the circuitry is further configured to:

select either the localized transmission mode or the distributed transmission mode to be used for the radio link; and notify the UE of the selection using one or more of: master information block (MIB) signaling, system information block (SIB) signaling, or user-equipment (UE)-specific dedicated radio-resource-control (RRC) signaling.

5. The cellular base station of claim 3, wherein the circuitry is further configured to allocate time resources and frequency resources for the xPDCCH using one or more of: a master information block (MIB), a system information block (SIB), or user-equipment (UE)-specific dedicated radio-resource-control (RRC) signaling.

6. The cellular base station of claim 1, wherein the circuitry is further configured to:

multiplex the 5G Physical Downlink Control Channel (xPDCCH) and the 5G Physical Downlink Control Channel (xPDSCH) in a Time-Division Multiplexing (TDM) manner; and receive a symmetric uplink transmission with a 5G Physical Uplink Control Channel (xPUCCH) and a 5G Physical Uplink Shared Channel (xPUSCH) multiplexed in a TDM manner.

7. The cellular base station of claim 6, wherein the circuitry is further configured to:

partition Transmission Time Intervals (TTIs) for the radio link such that each TTI comprises:

a downlink control information (DCI) region reserved for the xPDCCH, an uplink control information (UCI) reserved for the xPUCCH, a symmetric uplink/downlink (UL/DL) data region, and guard bands separating the DCI region, the UCI region, and the symmetric UL/DL data region; and dynamically assign the symmetric UL/DL region to be used for one of: the xPDSCH, the xPUSCH, or an almost blank subframe (ABS).

8. The cellular base station of claim 7, wherein the circuitry is further configured to:

semi-statically configure a length of the DCI region, a length of the UCI region, or a length of the symmetric UL/DL region using one or more of: master information block (MIB) signaling, system information block (SIB) signaling, or user-equipment (UE)-specific dedicated radio-resource-control (RRC) signaling.

9. The cellular base station of claim 7, wherein the circuitry is further configured to:

dynamically indicate a length of the DCI region, a length of the UCI region, or a length of the symmetric UL/DL region using physical layer signaling.

10. The cellular base station of claim 6, wherein the circuitry is further configured to:

partition Transmission Time Intervals (TTIs) for the radio link such that each TTI has a symmetric uplink/downlink (UL/DL)-region and at least one of a downlink control information (DCI) region reserved for the xPDCCH or an uplink control region (UCI) reserved for the xPUCCH, but not both; and dynamically assign the symmetric UL/DL region to be used for one of: the xPDSCH, the xPUSCH, or an almost blank subframe (ABS).

* * * * *